United States Patent
Mukai et al.

(10) Patent No.: US 9,967,518 B2
(45) Date of Patent: May 8, 2018

(54) VIDEO CONFERENCE SYSTEM

(71) Applicant: Sharp Kabushiki Kaisha, Sakai, Osaka (JP)

(72) Inventors: Shigeki Mukai, Sakai (JP); Yasutaka Wakabayashi, Sakai (JP); Seiichi Tanaka, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days. days.

(21) Appl. No.: 15/314,031

(22) PCT Filed: May 19, 2015

(86) PCT No.: PCT/JP2015/064321
§ 371 (c)(1),
(2) Date: Nov. 25, 2016

(87) PCT Pub. No.: WO2015/182440
PCT Pub. Date: Dec. 3, 2015

(65) Prior Publication Data
US 2017/0187987 A1  Jun. 29, 2017

(30) Foreign Application Priority Data
May 29, 2014  (JP) .................................. 2014-111419

(51) Int. Cl.
*H04N 7/15*  (2006.01)
*H04N 7/14*  (2006.01)
(Continued)

(52) U.S. Cl.
CPC ......... *H04N 7/147* (2013.01); *G06K 9/00255* (2013.01); *G06T 3/60* (2013.01);
(Continued)

(58) Field of Classification Search
None
See application file for complete search history.

(56) References Cited

U.S. PATENT DOCUMENTS

2009/0268099 A1* 10/2009 Kazumi ................ H04N 5/265
                                                                  348/705
2012/0044330 A1*  2/2012 Watanabe .......... G02B 27/2214
                                                                   348/54
(Continued)

FOREIGN PATENT DOCUMENTS

JP        2010-93583 A      4/2010
JP        2011-66745 A      3/2011
(Continued)

*Primary Examiner* — Creighton Smith
(74) *Attorney, Agent, or Firm* — Birch, Stewart, Kolasch & Birch, LLP

(57) ABSTRACT

In a video conference system in which at least a pair of terminal devices transmits and receives an image through a network, each of the terminal devices includes a face detection unit that detects a face from a first image which is a image captured by a camera, and a generation unit that generates a image in which a image of the face detected by the face detection unit is arranged around a image region of a second image, which is a image of a material used for a conference, in accordance with a relative position of the face in the first image.

3 Claims, 22 Drawing Sheets

(51) Int. Cl.
*G06K 9/00* (2006.01)
*G06T 7/70* (2017.01)
*G06T 3/60* (2006.01)
*G06T 11/60* (2006.01)
*H04L 29/06* (2006.01)

(52) U.S. Cl.
CPC ............... *G06T 7/70* (2017.01); *G06T 11/60* (2013.01); *H04L 65/403* (2013.01); *H04N 7/15* (2013.01)

(56) References Cited

U.S. PATENT DOCUMENTS

| | | |
|---|---|---|
| 2013/0182914 A1 | 7/2013 | Sakai et al. |
| 2014/0195915 A1* | 7/2014 | Iwase .................. G11B 27/034 715/721 |
| 2015/0094097 A1* | 4/2015 | Fraccaroli ............. H04W 4/021 455/456.3 |

FOREIGN PATENT DOCUMENTS

| | | |
|---|---|---|
| JP | 2012-85009 A | 4/2012 |
| JP | 2013-115527 A | 6/2013 |

* cited by examiner

1a (0) DEGREE  (45) DEGREES  (90) DEGREES  (135) DEGREES

VIDEO CONFERENCE SYSTEM

TECHNICAL FIELD

The present invention relates to a video conference system.

This application claims priority based on Japanese Patent Application No. 2014-111419 filed in Japan on May 29, 2014, the content of which is incorporated herein.

BACKGROUND ART

With the widespread use of the high-speed Internet using optical communication, high-speed wireless communication, or the like, a video conference system has been used recently in which bi-directional communication is performed by connecting a television and a camera. In this video conference system, there has been a need for sharing a material between both sides to simultaneously see a material image and an image from a camera on a counterpart side (an image of a face of a participant on the counterpart side) on the same display.

For example, in a system in which a material image and an image from a camera on the counterpart side are simultaneously seen on the same display, a method is considered in which a screen is divided into two screens so that the material image is displayed on a main-screen and the image from the camera is displayed on a sub-screen and the two screens are displayed side by side, but when the main-screen and the sub-screen are simply displayed side by side in a limited display region of a display screen, a display size of the material image becomes small, so that there is a problem that letters are difficult to be read, for example.

As a method for solving the problem, for example, in PTL 1, a face of a person uttering a voice is cut out of an image from a camera, superimposed on a material image, and displayed. Therefore, it is possible to recognize a face of a participant on a counterpart side without changing a display size of the material image. Moreover, in PTL 2, images of cameras at a plurality of locations are displayed as icons around a material image, and when any of the icons is selected by a user, a face of a participant at the location is superimposed and displayed on a material image, so that it is possible to see the material while recognizing a participant.

CITATION LIST

Patent Literature

PTL 1: Japanese Unexamined Patent Application Publication No. 2013-115527
PTL 2: Japanese Unexamined Patent Application Publication No. 2010-93583

SUMMARY OF INVENTION

Technical Problem

However, with the method described in PTL 1, when there are a plurality of participants on the counterpart side, only an image of a speaker of the participants is superimposed on the material image and thus reactions or situations of other participants with respect to contents of a speech of the speaker are difficult to be recognized, which may cause communication between participants to be difficult. Further, since a face of a person is superimposed on a part of the material image, a letter or an image may be hidden under the face and the visibility is deteriorated depending on contents of the material. In addition, with the method described in PTL 2, since the image of the participant at the selected location is superimposed on a part of the material image, as the number of selected locations increases or as the number of participants increases, the material is hidden under the images of participants. In this manner, it has been difficult to achieve both the visibility of a material image and the recognition of situations of participants on a counterpart side.

An aspect of the invention has been made in view of the aforementioned circumstances, and provides a video conference system in which situations of participants on a counterpart side are able to be recognized while maintaining visibility of a material image for a conference.

Solution to Problem

An aspect of the invention is a video conference system in which at least a pair of terminal devices transmits and receives an image through a network, in which each of the terminal devices includes a face detection unit that detects a face from a first image which is a image captured by a camera, and a generation unit that generates a image in which a image of the face detected by the face detection unit is arranged around a image region of a second image, which is an image of a material used for a conference, in accordance with a relative position of the face in the first image.

Advantageous Effects of Invention

According to the aspect of the invention, it is possible to recognize situations of a participant on a counterpart side while maintaining visibility of a material image for a conference.

DESCRIPTION OF EMBODIMENTS

Figure 1:
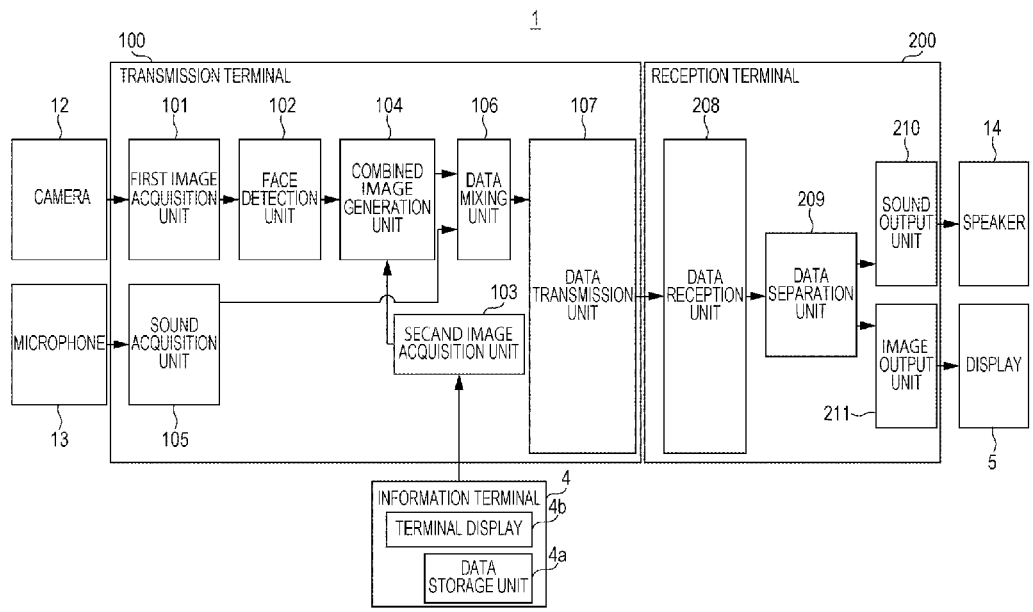
FIG. 1 is a block diagram illustrating an example of a schematic configuration of a video conference system according to a first embodiment.

Description will hereinafter be given for embodiments of the invention with reference to drawings. The drawings indicate specific embodiments and examples conforming to the principle of the invention. However, these are for understanding of the invention and are never used to limitedly interpret the invention. Relative sizes of the components in the drawings are exaggerated for better understanding and are different from actual sizes.

First Embodiment

First, a first embodiment of the invention will be described.

FIG. 1 is a block diagram illustrating an example of a schematic configuration of a video conference system 1 according to the first embodiment of the invention.

The video conference system 1 includes a transmission terminal 100, an information terminal 4, a camera 12, and a microphone 13 which are connected to the transmission terminal 100, a reception terminal 200, a display 5 and a speaker 14 which are connected to the reception terminal 200.

The camera 12 is an image capturing device for capturing an image of a participant of a conference who is around the transmission terminal 100, and supplies the captured image to the transmission terminal 100 connected through a cable or the like. The microphone 13 collects sound around the transmission terminal 100 and supplies a sound signal to the transmission terminal 100 connected through a cable or the like. Note that, the sound is not limited to voice of a person but refers to various sounds and voices.

The display 5 is a display device including a CRT (Cathode Ray Tube), a LCD (Liquid Crystal Display), an organic EL (Electro-Luminescence) display, or the like, or a image projection device such as a projector, and may be any device as long as being a device which displays a image and information. For example, the display 5 displays an image output from the reception terminal 200. The speaker 14 converts a sound signal output from the reception terminal 200 into sound for output. Note that, the speaker 14 may output sound of one channel or output sound of right and left two channels.

The information terminal 4 may be any information device as long as being, for example, a fixed information terminal such as a personal computer, or a device such as a digital camera which generates a material image used for a conference. Here, description will be given by assuming that the information terminal 4 is a notebook personal computer. The information terminal 4 includes a data storage unit 4a and a terminal display 4b. The data storage unit 4a includes a semiconductor storage device or a magnetic storage device, such as a HDD (Hard Disk Drive), a flash memory, or a DRAM (Dynamic Random Access Memory). In the data storage unit 4a, data of a material used for a conference (a material such as a document, a still image, or a video, or a presentation material) is stored. For example, the information terminal 4 outputs a still and video are included of a material (hereinafter, also referred to as a material image) used for a conference based on data read from the data storage unit 4a. The terminal display 4b displays an image or information similarly to the display 5 described above.

The transmission terminal 100 and the reception terminal 200 are terminal devices which communicate with each other through a network, and an example thereof includes a fixed information terminal such as a set top box or a personal computer, a mobile communication terminal such as a PDA (Personal Digital Assistant) or a smartphone, or a communication apparatus dedicated for a video conference.

The transmission terminal 100 is an example of a terminal device on a transmission side in the video conference system 1. The illustrated transmission terminal 100 includes a first image acquisition unit 101, a face detection unit 102, a second image acquisition unit 103, a combined image generation unit 104 (generation unit), a sound acquisition unit 105, a data mixing unit 106, and a data transmission unit 107.

The first image acquisition unit 101 acquires an image captured by the camera 12 (hereinafter, also referred to as a camera image). The face detection unit 102 detects a face from the camera image acquired by the first image acquisition unit 101. For example, the face detection unit 102 detects a region of the face from the camera image acquired by the first image acquisition unit 101 and detects an angle of a rotational direction of the detected face. Here, the angle of the rotational direction of the face is an angle of a rotational direction of the face a rotational center of which is a center of the face when viewed from the front. The second image acquisition unit 103 reads material image data used for a conference from the data storage unit 4a included in the information terminal 4 and acquires the data as a material image.

The combined image generation unit 104 cuts out the region of the face detected by the face detection unit 102 from the image acquired by the first image acquisition unit 101 and combines a image of the face which is cut out (hereinafter, also referred to as a face image) with the material image acquired by the second image acquisition unit 103. The combined image generation unit 104 supplies combined image data which is obtained by combining to the data mixing unit 106.

The sound acquisition unit 105 acquires a sound signal supplied from the microphone 13 and supplies sound data according to the acquired sound signal to the data mixing unit 106.

The data mixing unit 106 mixes the combined image data generated by the combined image generation unit 104 with the sound data acquired by the sound acquisition unit 105 and supplies mixed data which is obtained by mixing to the data transmission unit 107. The data transmission unit 107 transmits the mixed data, which is supplied from the data mixing unit 106, to the reception terminal 200.

The reception terminal 200 is an example of a terminal device on a reception side in the video conference system 1. The illustrated reception terminal 200 includes a data reception unit 208, a data separation unit 209, a sound output unit 210, and an image output unit 211.

The data reception unit 208 receives the mixed data transmitted from the transmission terminal 100. The data separation unit 209 separates the mixed data received by the data reception unit 208 into sound data and image data. Then, the data separation unit 209 supplies the sound data to the sound output unit 210 and supplies the image data to the image output unit 211.

The sound output unit 210 converts the sound data, which is separated from the mixed data by the data separation unit 209, into a predetermined sound signal and outputs the signal to the speaker 14. The image output unit 211 converts the image data, which is separated from the mixed data by the data separation unit 209, into a predetermined image signal and outputs the signal to the display 5. Thereby, an image based on the image data is displayed on the display 5.

In this manner, in the reception terminal 200, a combined image of the material image and the face image (a face image of a participant of a conference on the transmission terminal 100 side) transmitted as the mixed data from the transmission terminal 100 is displayed on the display 5, and sound transmitted as the mixed data from the transmission terminal 100 (sound of the participant of the conference on the transmission terminal 100 side) is output from the speaker 14.

Note that, the reception terminal 200 may further include components of the transmission terminal 100 and may be a terminal device which is also able to execute functions of the transmission terminal 100. The transmission terminal 100 may further include components of the reception terminal 200 and may be a terminal device which is also able to execute functions of the reception terminal 200.

(Specific Example of Usage Environment of Video Conference System 1)

Next, an example of a usage environment of the video conference system 1 according to the present embodiment will be described with reference to FIG. 2.

Figure 2:
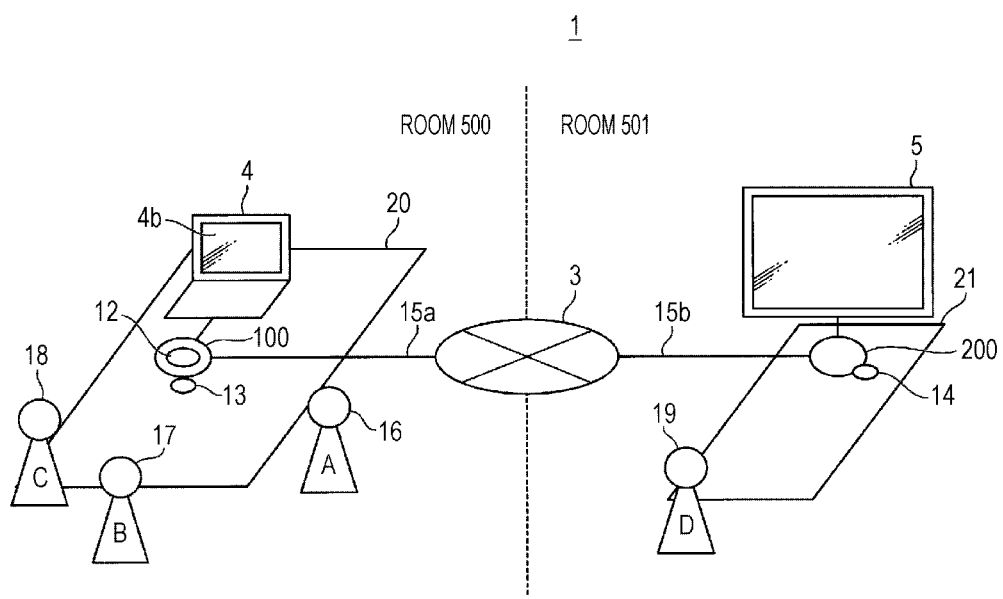
FIG. 2 is a schematic view illustrating an example of a usage environment of the video conference system according to the first embodiment.

FIG. 2 is a schematic view illustrating an example of a usage environment of the video conference system 1 according to the present embodiment. The illustrated video conference system 1 includes the transmission terminal 100 and the reception terminal 200 as at least a pair of terminal devices. The transmission terminal 100 installed in a room 500 and the reception terminal 200 installed in a room 501 communicate with each other through a network 3 so that a video conference is carried out. The network 3 is, for example, the Internet or a public network, and the connection is performed by using any one of them or the connection is performed by combining both of them. Note that, the transmission terminal 100 and the reception terminal 200 are respectively connected to the network 3 via a LAN (Local Area network) 15a and a LAN 15b. Note that, each of the LANs 15a and 15b may be a wired LAN or a wireless LAN.

The transmission terminal 100 is installed at almost the center of a table 20 in the room 500. The information terminal 4, the camera 12, and the microphone 13 are installed on the table 20 and connected to the transmission terminal 100. Moreover, in the room 500, three participants of a participant A16, a participant B17, and a participant C18 attend (participate in) a video conference. The three participants are on the side opposite to a position of the information terminal 4 across the transmission terminal 100 installed on the table 20. That is, there is a positional relation that the participant A16, the participant B17, the participant C18, and the information terminal 4 surround the transmission terminal 100. Further, the participant A16, the participant B17, and the participant C18 are at positions at which the terminal display 4b of the information terminal 4 is visible, and the video conference is able to be carried out while seeing a displayed image on the terminal display 4b of the information terminal 4.

The camera 12 is installed at almost the center of the table 20 (here, on the transmission terminal 100). For example, the camera 12 is a fish-eye camera that uses an equidistant projection system in which a distance from the center of a circle with an angle of view of 180 degrees is proportional to an incident angle, and is installed upwardly so that an angle of view becomes wide and an optical axis perpendicularly crosses a ceiling surface of the room 500. Note that, the ceiling surface of the room 500 is parallel to a table surface of the table 20. Thus, the camera 12 is able to simultaneously capture, as one image, the information terminal 4, the participant A16, the participant B17, and the participant C18 that are positioned to surround the transmission terminal 100. The microphone 13 uses a non-directional microphone and is able to collect sound generated around the camera 12.

On the other hand, the reception terminal 200 is installed on the table 21 in the room 501. The display 5 and the speaker 14 are installed on the table 21 and connected to the reception terminal 200. In the room 501, a participant D19 attends the video conference. The participant D19 is on the side opposite to a position of the display 5 across the reception terminal 200 installed on the table 21. That is, the participant D19 is at a position at which the display 5 is visible, and the video conference is able to be carried out while seeing a displayed image on the display 5.

(Processing of Video Conference System 1)

Next, processing in the video conference system 1 according to the present embodiment will be described in detail with reference to FIG. 3 to FIG. 12.

Figure 3:
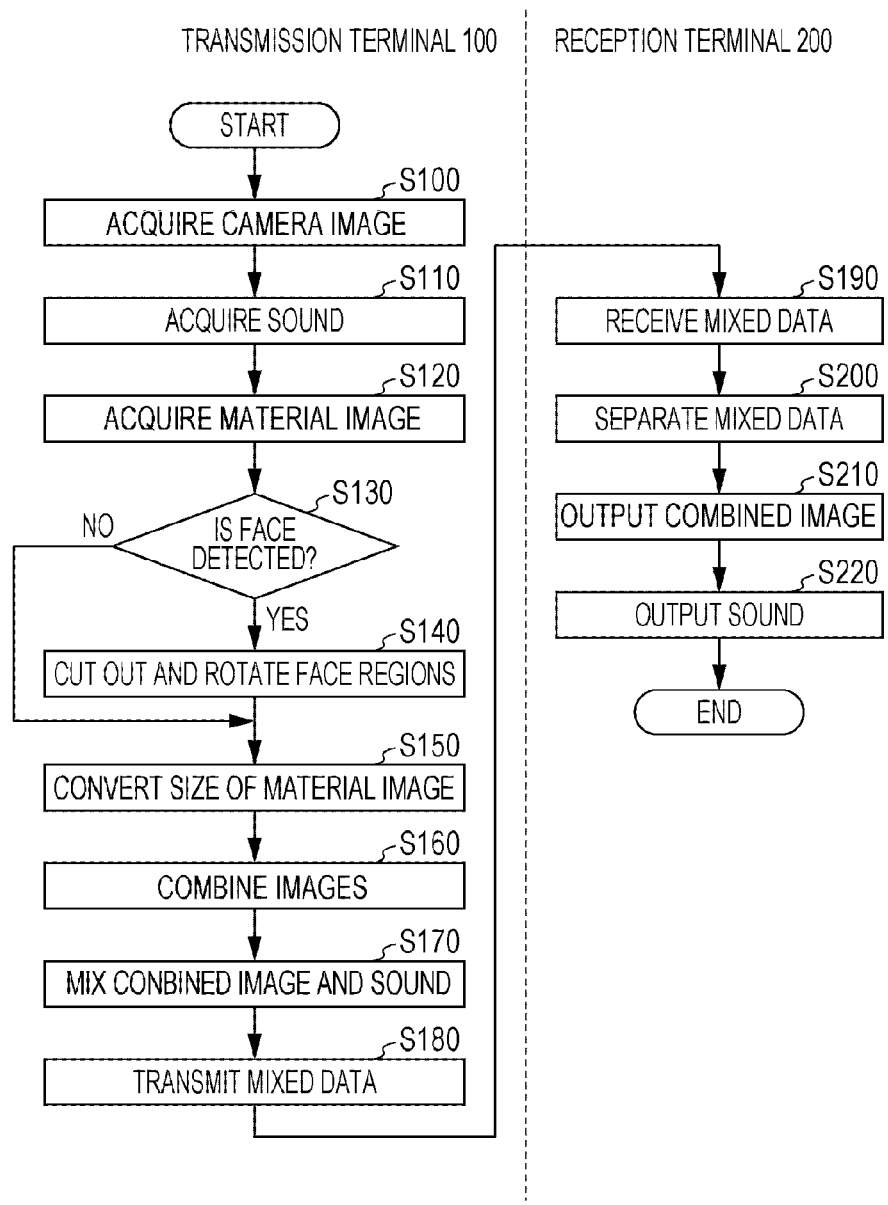
FIG. 3 is a flowchart indicating a flow of processing in the video conference system according to the first embodiment.

FIG. 3 is a flowchart indicating a flow of the processing in the video conference system 1 according to the present embodiment. FIG. 4 to FIG. 8 are explanatory views for explaining functions executed by components in accordance with the processing in the video conference system 1.

Figure 4:
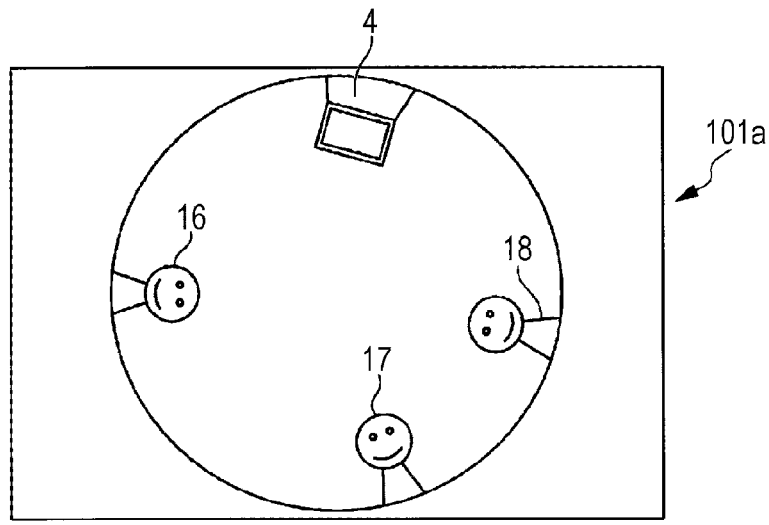
FIG. 4 illustrates an example of a camera image according to the first embodiment.

First, the first image acquisition unit 101 acquires a camera image (first image) captured by the camera 12 (step S100). FIG. 4 illustrates an example of a camera image 101a captured by the camera 12. As illustrated in the figure, the information terminal 4, the participant A16, the participant B17, and the participant C18 are captured in the camera image 101a. The sound acquisition unit 105 acquires a sound signal from the microphone 13 in response to speeches of the participant A16, the participant B17, and the participant C18 (step S110).

The second image acquisition unit 103 acquires a material image (second image) based on data stored in the data storage unit 4a of the information terminal 4 (step S120). Here, examples of the data stored in the data storage unit 4a include image data of a jpeg (Joint Photographic Experts Group) format, a PNG (Portable Network Graphic) format, or the like, and data of a PDF (registered trademark) format, a Power Point (registered trademark) format, or the like. The data stored in the data storage unit 4a may be data in various formats other than the above.

The first image acquisition unit 101 supplies the camera image 101a acquired from the camera 12 to the face detection unit 102. The face detection unit 102 performs face detection processing for detecting a face from the camera image 101a supplied from the first image acquisition unit 101. For example, in the face detection processing, a face is detected in such a manner that a search window (for example, a determination region of 8×8 pixels) is moved to scan from the upper left sequentially on an image subjected to face detection and whether or not there is a region having feature points which is able to be recognized as a face is determined for each region of the search windows. As a method for the face detection, for example, various algorithms such as a Viola-Jones method are proposed and any face detection method may be used.

In the face detection processing described above, the face detection unit 102 determines whether or not a face is detected from the camera image 101a (step S130). When a face is not detected from the camera image 101a (step S130: No), the face detection unit 102 ends the face detection processing and the procedure proceeds to step S150. On the other hand, when a face is detected from the camera image 101a (step S130: Yes), the face detection unit 102 supplies coordinates of a region of the detected face and an angle of a rotational direction of the face when being detected to the combined image generation unit 104.

Figure 5:
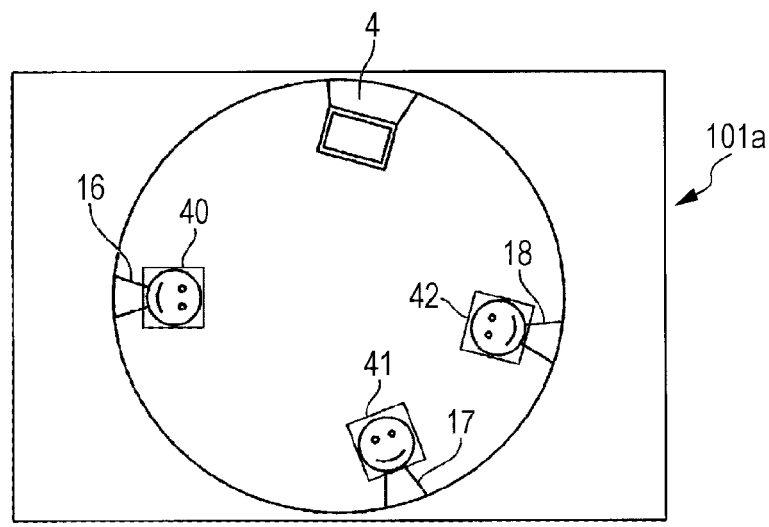
FIG. 5 illustrates an example of a face detection result with respect to the camera image according to the first embodiment.

FIG. 5 illustrates an example of a face detection result with respect to the camera image 101a. For example, when performing the face detection processing for the camera image 101a illustrated in FIG. 4, the face detection unit 102 detects a face region 40 of the participant A16, a face region 41 of the participant B17, and a face region 42 of the participant C18 as illustrated in FIG. 5, and detects an angle of a rotational direction of each of the detected faces. Note that, the rotational direction of the face is a rotational direction of the face a rotational center of which is a center of the face when viewed from the front.

Figure 6:
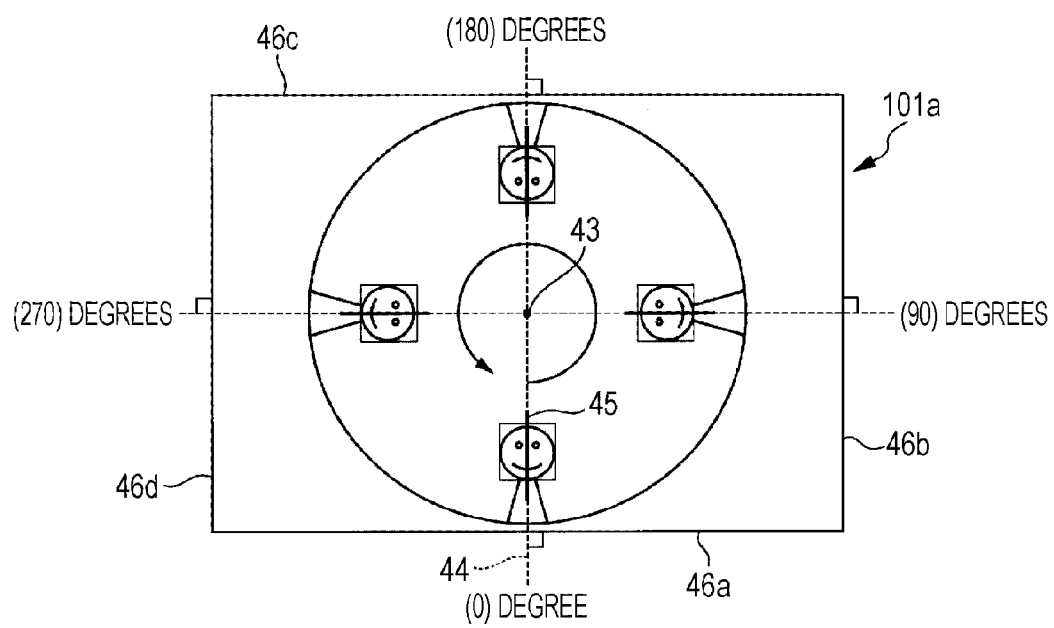
FIG. 6 is an explanatory view of angles of rotational directions of faces.

FIG. 6 is an explanatory view of angles of rotational directions of faces. With reference to this figure, angles of rotational directions of faces will be described. As illustrated in the figure, when a straight line 44 connecting a center coordinate 43 of an image region of the camera image 101a and a lower side 46a of the camera image 101a is orthogonal to the lower side 46a, an angle of a rotational direction of the straight line 44 with the center coordinate 43 as a rotational center is set as 0 degree. When there is a relation in which this straight line 44 is parallel to a center line 45 of a face, which serves as a border line dividing the face into a left half and a right half, an angle of a rotational direction of the face is set as 0 degree. The face detection unit 102 is able to detect an angle of a rotational direction of a face in a range from 0 degree to 359 degrees in a counterclockwise manner.

For example, when the straight line 44 is rotated with the center coordinate 43 as the rotational center, the angle of the rotational direction of the straight line 44 when being orthogonal to a right side 46b of the camera image 101a is 90 degrees, the angle of the rotational direction of the straight line 44 when being orthogonal to an upper side 46c is 180 degrees, and the angle of the rotational direction of the straight line 44 when the straight line 44 is orthogonal to a left side 46d is 270 degrees. In a case where the straight lines 44 when the angle of the rotational direction is 90 degrees, 180 degrees, and 270 degrees are parallel to the center lines 45 of the faces, the angles of the rotational directions of the faces are 90 degrees, 180 degrees, and 270 degrees.

Next, the combined image generation unit 104 cuts out regions of the faces from the camera image 101a, which is acquired by the first image acquisition unit 101, based on coordinate information of the face regions detected by the face detection unit 102, and performs rotation processing of the cut-out face images so that angles of the rotational directions of the faces are 0 degree based on the angles of the rotational directions of the detected faces (step S140). The combined image generation unit 104 performs processing for converting (reducing) an image size for the material image acquired by the second image acquisition unit 103 (step S150).

Subsequently, the combined image generation unit 104 arranges the face images, which have been cut out and subjected to the rotation processing, around an image region of the material image, the size of which has been converted, so that the face images do not overlap the material image. For example, the combined image generation unit 104 generates a combined image in which the face images which have been cut out and subjected to the rotation processing are arranged around the image region of the material image in accordance with relative positions of the faces in the camera image 101a. Specifically, first, the combined image generation unit 104 generates a background image filled with black and attaches the material image, the size of which has been converted (reduced), to a center of the background image. Then, the combined image generation unit 104 attaches the face images, which have been cut out and subjected to the rotation processing, to a region of the background image around the image region of the material image, the size of which has been converted (reduced), based on center coordinates of the face regions detected in the camera image 101a while maintaining a relative positional relation between the face regions and generates the combined image (step S160).

The processing of the combined image generation unit 104 at step S140 to step S160 will be specifically described below with reference to FIG. 7 to FIG. 12. Note that, a resolution of the camera image 101a (refer to FIG. 4) acquired by the first image acquisition unit 101 at step S100 is set as horizontal 1280 pixels×vertical 720 pixels. In addition, it is set that the face detection unit 102 detects regions of the face region 40 of the participant A16 (horizontal 100 pixels×vertical 100 pixels), the face region 41 of the participant B17 (horizontal 100 pixels×vertical 100 pixels), and the face region 42 of the participant C18 (horizontal 100 pixels×vertical 100 pixels) as face regions at step S130 (refer to FIG. 5).

At step S140, the combined image generation unit 104 cuts out the regions of the faces detected by the face detection unit 102 from the camera image 101a acquired by the first image acquisition unit 101 and performs rotation processing for the cut-out face images.

Figure 7:
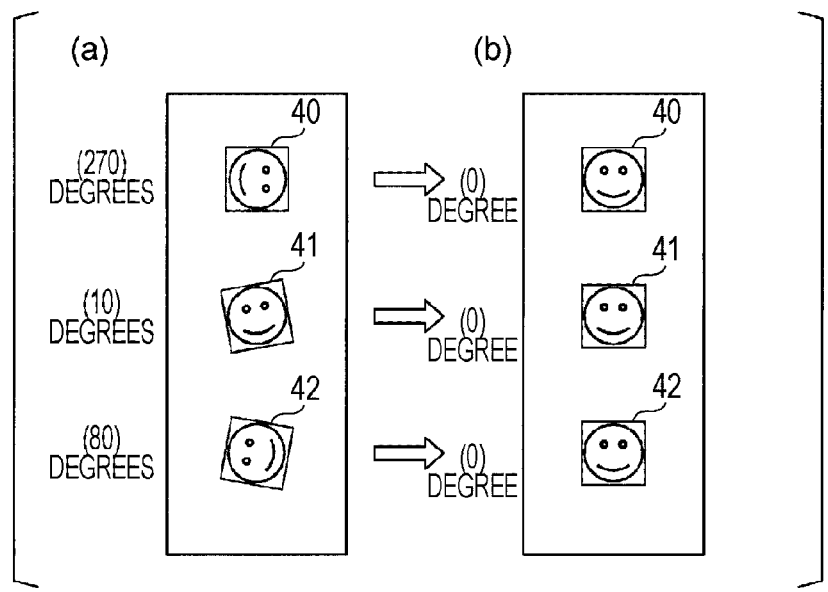
FIG. 7 is an explanatory view of rotation processing for faces detected from the camera image.

FIG. 7 is an explanatory view of the rotation processing for the faces detected from the camera image 101a. FIG. 7(a) illustrates the face regions cut out from the camera image 101a. An example of the face images is indicated here in the case where the angles of the rotational directions of the faces of the detected face region 40, face region 41, and face region 42 are respectively 270 degrees, 10 degrees, and 80 degrees. The combined image generation unit 104 performs the rotation processing so that the rotational directions of the faces are 0 degree. FIG. 7(b) illustrates face images of the face region 40, the face region 41, and the face region 42 after the rotation processing.

Figure 8:
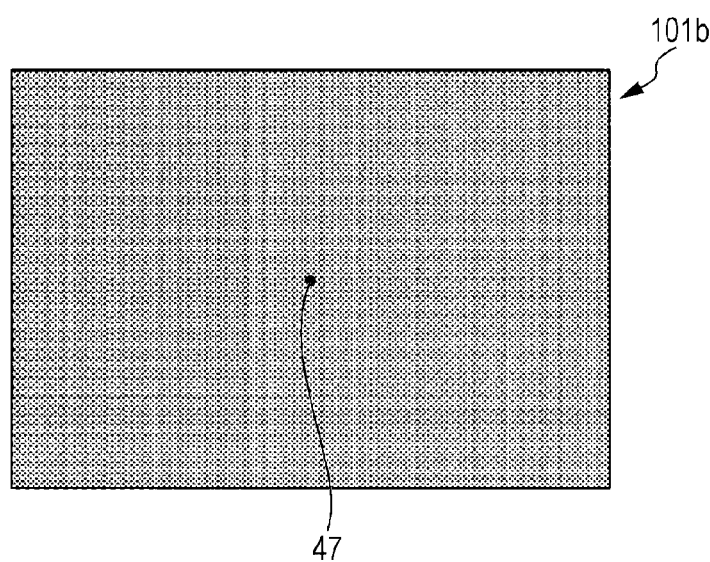
FIG. 8 illustrates an example of a background image.

Next, at step S150, the combined image generation unit 104 reduces the size of the material image acquired by the second image acquisition unit 103 and attaches the resultant image to the background image. FIG. 8 illustrates an example of a background image. For example, the combined image generation unit 104 generates an image (horizontal 1280 pixels×vertical 720 pixels) filled with black as illustrated in the figure as a background image 101b. Note that, though the image filled with black is used as the background image 101b, any images such as a image of a different color, an image with patterns, and a picture image may be used as the background image. A reference sign 47 denotes a center coordinate of an image region of the background image 101b.

Figure 9:
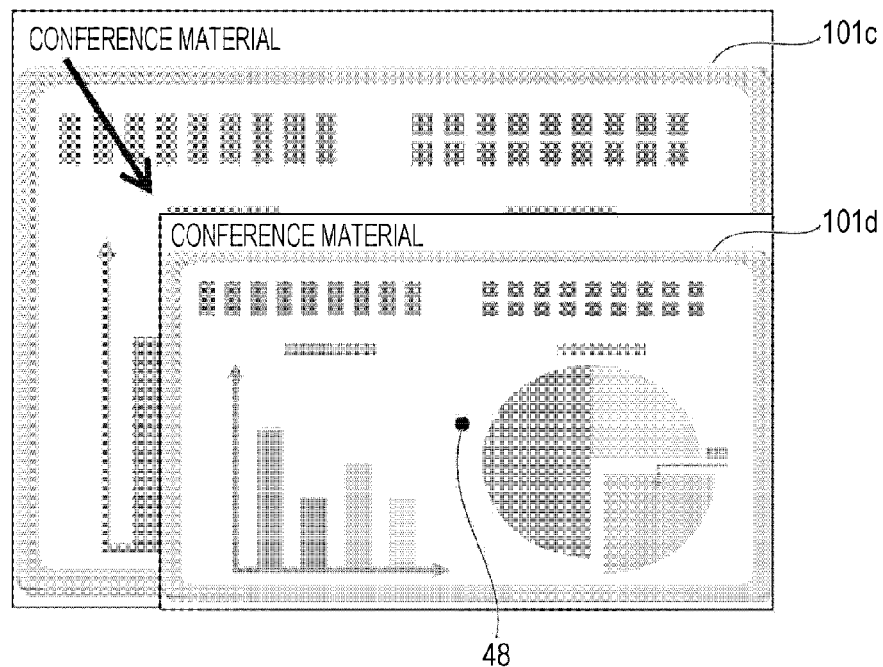
FIG. 9 is an explanatory view of reduction processing for a material image.

Further, in the case where the material image acquired by the second image acquisition unit 103 has horizontal 1280 pixels×vertical 720 pixels, the combined image generation unit 104 performs reduction processing so that the material image has horizontal 1080 pixels×vertical 520 pixels. FIG. 9 is an explanatory view of reduction processing for a material image. This figure indicates that a material image 101c (before reduction processing) acquired by the second image acquisition unit 103 is reduced to a material image 101d. A reference sign 48 denotes a center coordinate of an image region of the material image 101d after the reduction processing.

Here, any method such as a nearest neighbor method, a bilinear method, or a bicubic method may be used for the reduction processing. The reduction processing may be processing for performing reduction with an aspect ratio fixed. When the reduction processing is performed with an aspect ratio fixed, the reduction needs to be performed by using a shorter one of a horizontal length and a vertical length as a reference, and the reduction may be performed to achieve horizontal 944× vertical 520 pixels in the case of the aforementioned resolution.

Figure 10:
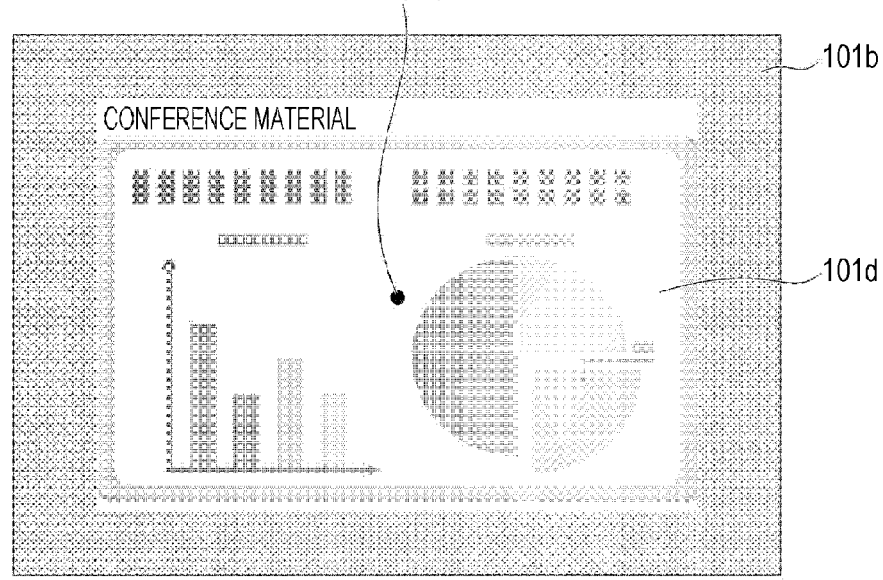
FIG. 10 illustrates an example of an image in which the material image is attached to a background image.

Next, the combined image generation unit 104 attaches the material image 101d to the background image 101b so that the center coordinate 47 of the background image 101b (refer to FIG. 8) and the center coordinate 48 of the material image 101d after the reduction processing (refer to FIG. 9) are matched. FIG. 10 illustrates an example of an image in which the material image 101d is attached to the background image 101b.

Then, at step S160, the combined image generation unit 104 generates a combined image in which the face images after the rotation processing illustrated in FIG. 7(b) are attached around (outside) the material image 101d in the image in which the material image 101d is attached to the background image 101b illustrated in FIG. 10. At this time, the combined image generation unit 104 attaches the face images while maintaining the relative positional relation between the face regions based on the center coordinates of the face regions detected in the camera image 101a.

Figure 11:
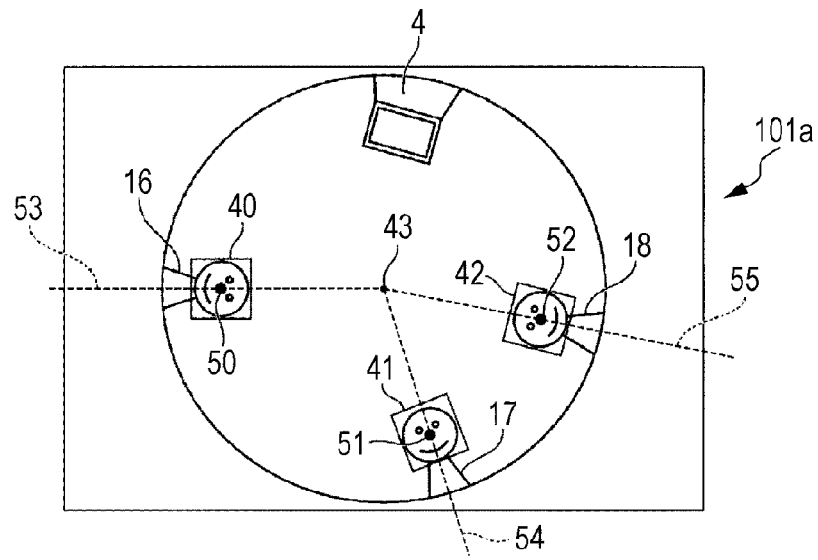
FIG. 11 illustrates relative positions of the faces in the camera image.

FIG. 11 illustrates relative positions of the faces in the camera image 101a. Center coordinates of the face region 40, the face region 41, and the face region 42 detected from the camera image 101a are respectively set as a coordinate 50, a coordinate 51, and a coordinate 52. Straight lines connecting the center coordinate 43 of the camera image 101a with the coordinate 50, the coordinate 51, and the coordinate 52 are respectively set as a straight line 53, a straight line 54, and a straight line 55. In this case, relative positions of the faces detected in the camera image 101a are able to be represented as positions on lines of the straight line 53, the straight line 54, and the straight line 55 with the center coordinate 43 of the camera image 101a as a reference.

Figure 12:
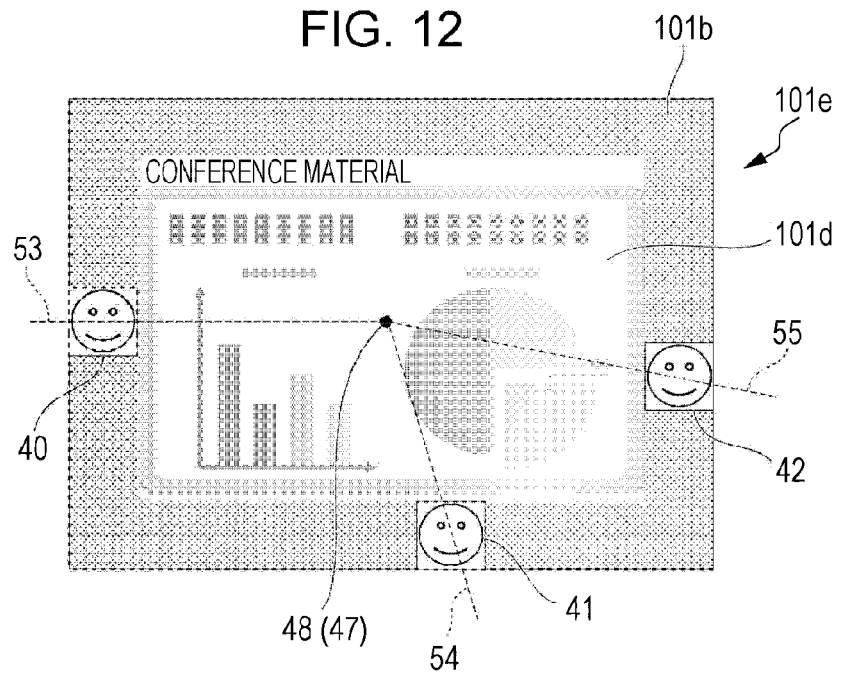
FIG. 12 illustrates a combined image in which the material image and face images are combined.

FIG. 12 illustrates an example of a combined image 101e in which the material image 101d and the face images are combined. The combined image generation unit 104 generates the combined image 101e by attaching the face images to the image which is illustrated in FIG. 10 and in which the material image 101d is attached to the background image 101b. At this time, the combined image generation unit 104 sets the center coordinate 48 of the material image 101d as a reference instead of the center coordinate 43 of the camera image 101a illustrated in FIG. 11, and attaches face images of the face region 40, the face region 41, and the face region 42 after the rotation processing illustrated in FIG. 7(b) to be on the straight lines of the straight line 53, the straight line 54, and the straight line 55, respectively with the center coordinate 48 as a reference and to be around (outside) the material image 101d.

Thereby, the face images displayed on the combined image 101e are displayed while maintaining a relative positional relation between the faces detected in the camera image 101a. Note that, the pixels of the camera image 101a, the face region 40, the face region 41, the face region 42, the background image 101b, the material image 101c, and the material image 101d are examples and are not limited thereto.

With reference back to FIG. 3, the processing subsequent to step S170 will be described.

The data mixing unit 106 performs mixing by synchronizing the combined image data generated by the combined image generation unit 104 with the sound data acquired by the sound acquisition unit 105 to convert them into a multiplexed stream (step S170). The data mixing unit 106 then supplies the mixed data obtained by mixing to the data transmission unit 107.

The data transmission unit 107 transmits the mixed data, which is supplied from the data mixing unit 106, to the reception terminal 200 via the LAN 15 (step S180). It is assumed here that communication using a communication protocol of H.320 is performed as an example of transmission and reception of the mixed data, but without limitation thereto, communication using any communication protocol such as H.323 and H.324 may be performed.

On the other hand, the reception terminal 200 receives the mixed data transmitted from the transmission terminal 100. For example, the data reception unit 208 of the reception terminal 200 receives the mixed data transmitted from the transmission terminal 100 and supplies the data to the data separation unit 209 (step S190). The data separation unit 209 separates the multiplexed stream of the mixed data into image data and sound data. The data separation unit 209 then supplies the separated image data to the image output unit 211 and supplies the separated sound data to the sound output unit 210 (step S200).

The image output unit 211 displays a image according to the image data on the display 5. That is, the image output unit 211 displays the combined image 101e (refer to FIG. 12) combined in the transmission terminal 100 on the display 5 (step S210). Further, the sound output unit 210 outputs sound according to the sound data from the speaker 14 (step S220).

As described above, in the video conference system 1 according to the present embodiment, at least a pair of terminal devices (for example, the transmission terminal 100 and the reception terminal 200) transmits and receives an image through the network 3. The transmission terminal 100 includes the face detection unit 102 and the combined image generation unit 104 (generation unit). The face detection unit 102 detects a face from the camera image 101a (first image) captured by the camera 12. The combined image generation unit 104 generates a combined image in which an image of the face detected by the face detection unit 102 is arranged around an image region of the material image 101d (second image) of a material used for a conference in accordance with a relative position of the face in the camera image 101a.

In this manner, in the video conference system 1 according to the present embodiment, the face image is displayed around the material image while maintaining a relative positional relation between coordinates at which the faces are detected, so that a video conference is able to be carried out while simultaneously seeing both of the material image of the conference and the face image of a participant on a counterpart side with visibility maintained. Further, in the video conference system 1, display is able to be performed while maintaining a relative positional relation between participants on the counterpart side, so that it is possible to intuitively recognize situations in the conference on the counterpart side and reactions of the participants merely within a limited display region. Thus, according to the present embodiment, it is possible to recognize situations of the participants on the counterpart side while maintaining visibility of the material image for the conference.

Note that, when arranging a face image around a material image, the combined image generation unit 104 is desired to arrange the face image outside the material image so as not to overlap the material image, but may arrange the face image so as to overlap a part of the material image to an extent of not significantly deteriorating visibility of the material image.

Though the example in which a fish-eye camera having an angle of view of 180 degrees is used for the camera 12 has been described, there is no limitation to the fish-eye camera having an angle of view of 180 degrees as long as being a camera with an angle of view for capturing almost all the participants attending the conference in the room 500 in which the camera 12 is installed. Here, the reason for describing as almost all is that it is not ensured that all the participants are captured by the camera depending on places where the participants are, even when the fish-eye camera having an angle of view of 180 degrees is used. For example, the camera 12 is desired to be a camera having an angle of view to an extent that all the participants in the vicinity of the periphery of the table 20 are able to be captured. Moreover, the camera 12 may be a camera which generates a panorama image or a full-perimeter image by combining a plurality of cameras and outputs the image.

Though the example in which a non-directional microphone is used for the microphone 13 has been described, any microphone may be used as long as being able to input sound generated around the camera 12.

Second Embodiment

Next, a second embodiment of the invention will be described.

In the first embodiment, the example in which the combined image 101e illustrated in FIG. 12 is generated by combining the face images detected from the camera image 101a illustrated in FIG. 4 to be around the image region of the material image 101d after reduction. In the case of this example, depending on an installation direction of the camera 12, a position of the terminal display 4b of the information terminal 4 varies in the camera image 101a and positions of participants to be detected also vary. Thus, in the first embodiment, even when a relative positional relation between face images of participants is maintained in a combined image, a direction from which the participants are seen varies depending on the installation direction of the camera 12. For example, as illustrated in FIG. 4, when a relative positional relation between face images detected from the camera image 101a is maintained so that the position of the terminal display 4b of the information terminal 4 is at an upper part in a vertical direction and at a center in a horizontal direction, the conference is able to be carried out with a relation in which the participants on the transmission side and the participant on the reception side face each other while seeing combined image. Therefore, it is necessary in the first embodiment to adjust an orientation of the camera 12 when the camera 12 is installed. An aspect in which it is not necessary to adjust the orientation will be described in the present embodiment.

Figure 13:
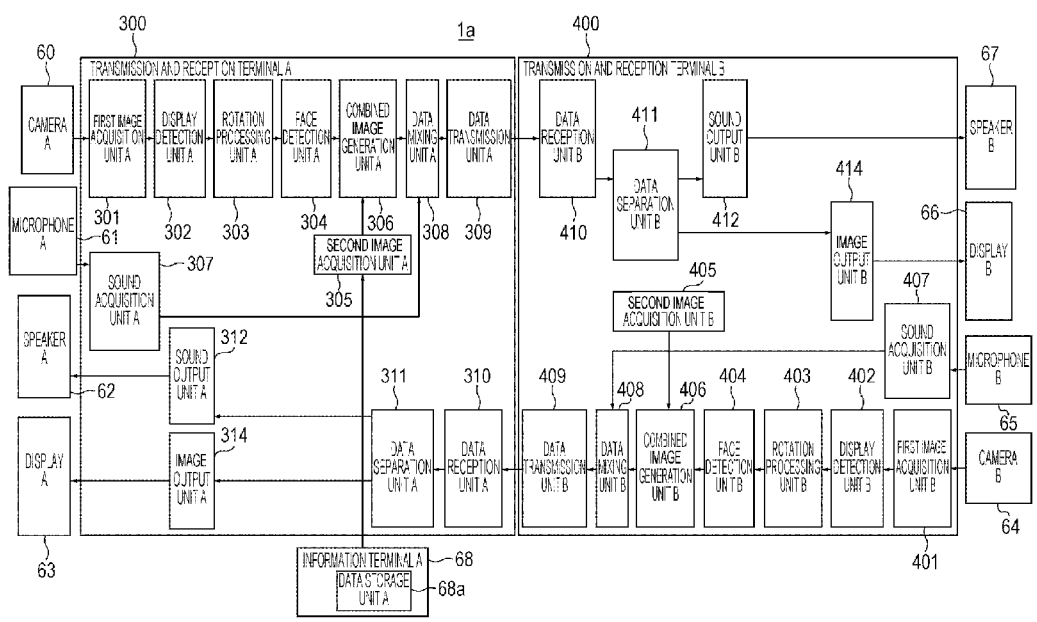
FIG. 13 is a block diagram illustrating an example of a schematic configuration of a video conference system according to a second embodiment.

FIG. 13 is a block diagram illustrating an example of a schematic configuration of a video conference system 1a according to the present embodiment. The video conference system 1a includes a transmission and reception terminal A300, a camera A60, and a microphone A61, a speaker A62, a display A63, and an information terminal A68 which are connected to the transmission and reception terminal A300, a transmission and reception terminal B400, a camera 1364, a microphone 1365, a display 1366, and a speaker B67 which are connected to the transmission and reception terminal B400.

The camera A60 and the camera B64 correspond to the camera 12 in FIG. 1, and the microphone A61 and the microphone B65 correspond to the microphone 13 in FIG. 1. The speaker A62 and the speaker B67 correspond to the speaker 14 in FIG. 1, and the display A63 and the display B66 correspond to the display 5 in FIG. 1. The information terminal A68 corresponds to the information terminal 4 in FIG. 1 and includes a data storage unit A68a in which data such as a material or information used for a conference is stored. Note that, the display A63 may be configured to correspond to the terminal display 4b included in the information terminal 4 in FIG. 1 and will be described here as being included in the information terminal A68.

The transmission and reception terminal A300 and the transmission and reception terminal B400 are terminal devices which communicate with each other through the network 3 similarly to the transmission terminal 100 and the reception terminal 200 in FIG. 1.

The transmission and reception terminal A300 includes a first image acquisition unit A301, a display detection unit A302 (position detection unit), a rotation processing unit A303, a face detection unit A304, a second image acquisition unit A305, a combined image generation unit A306

(generation unit), a sound acquisition unit A307, a data mixing unit A308, a data transmission unit A309, a data reception unit A310, a data separation unit A311, a sound output unit A312, and a image output unit A314.

The first image acquisition unit A301 acquires a image captured by the camera A60. The display detection unit A302 detects a position of the display A63 from the image acquired by the first image acquisition unit A301. The rotation processing unit A303 performs rotation processing for the image acquired by the first image acquisition unit A301 in accordance with the position of the display A63 detected by the display detection unit A302.

The face detection unit A304 detects a region of a face and an angle of a rotational direction of the face from the image for which the rotation processing has been performed by the rotation processing unit A303. The second image acquisition unit A305 reads material image data used for a conference from the data storage unit A68a included in the information terminal A68 and acquires the data as a material image.

The combined image generation unit A306 cuts out the region of the face detected by the face detection unit A304 from the image acquired by the first image acquisition unit A301 and combines a face image which is cut out with the material image acquired by the second image acquisition unit A305. The combined image generation unit A306 supplies combined image data which is obtained by combining to the data mixing unit A308. The sound acquisition unit A307 acquires a sound signal supplied from the microphone A61 and supplies sound data according to the acquired sound signal to the data mixing unit A308.

The data mixing unit A308 mixes the combined image data generated by the combined image generation unit A306 with the sound data acquired by the sound acquisition unit A307 and supplies mixed data which is obtained by mixing to the data transmission unit A309. The data transmission unit A309 transmits the mixed data, which is supplied from the data mixing unit A308, to the transmission and reception terminal B400.

Next, as a function of the reception side, the data reception unit A310 receives the mixed data transmitted from the transmission and reception terminal B400. The data separation unit A311 separates the mixed data received by the data reception unit A310 into sound data and image data. The data separation unit A311 then supplies the sound data to the sound output unit A312 and supplies the image data to the image output unit A314.

The sound output unit A312 converts the sound data, which is separated from the mixed data by the data separation unit A311, into a predetermined sound signal and outputs it to the speaker A62. The image output unit A314 converts the image data, which is separated from the mixed data by the data separation unit A311, into a predetermined image signal and outputs it to the display A63. Thereby, an image based on the image data is displayed on the display A63 of the information terminal A68.

Note that, the transmission and reception terminal 13400 has a similar configuration and a similar function to each component of the transmission and reception terminal A300. For example, the transmission and reception terminal B400 includes a first image acquisition unit B401, a display detection unit B402 (position detection unit), a rotation processing unit B403, a face detection unit B404, a second image acquisition unit B405, a combined image generation unit B406 (generation unit), a sound acquisition unit B407, a data mixing unit B408, a data transmission unit B409, a data reception unit B410, a data separation unit B411, a sound output unit B412, and a image output unit B414, and these components correspond to the components of the transmission and reception terminal A300. Note that, though an information terminal corresponding to the information terminal A68 of the transmission and reception terminal B400 is not showed in FIG. 13, an information terminal may be connected or may not be connected to the transmission and reception terminal B400.

(Specific Example of Usage Environment of Video Conference System 1a)

Figure 14:
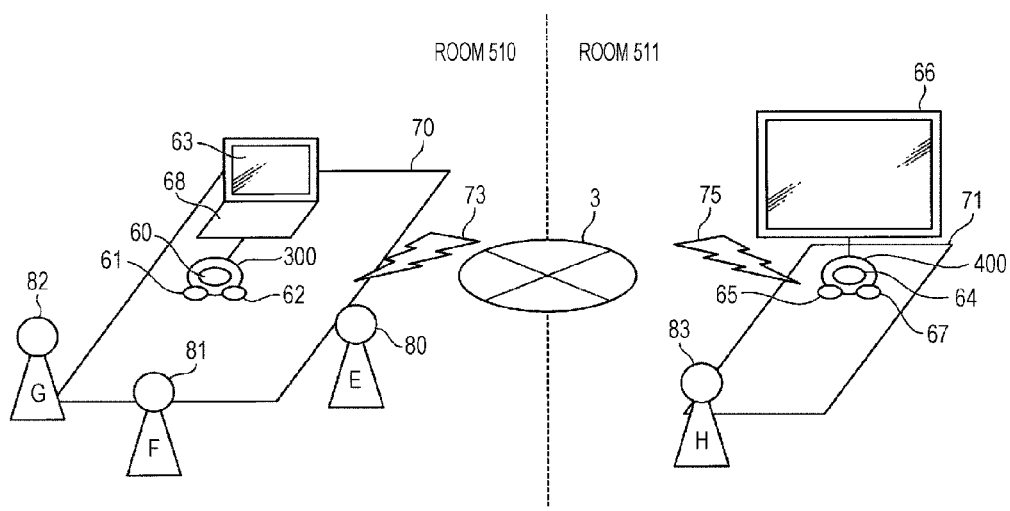
FIG. 14 is a schematic view illustrating an example of a usage environment of the video conference system according to the second embodiment.

Next, an example of a usage environment of the video conference system 1a according to the present embodiment will be described with reference to FIG. 14. FIG. 14 is a schematic view illustrating an example of a usage environment of the video conference system 1a according to the present embodiment.

The illustrated video conference system 1a includes the transmission and reception terminal A300 and the transmission and reception terminal B400 as at least a pair of terminal devices. The transmission and reception terminal A300 installed in a room 510 and the transmission and reception terminal B400 installed in a room 511 communicate with each other through the network 3 so that a video conference is carried out. In the present example, the transmission and reception terminal A300 and the transmission and reception terminal B400 are respectively connected to the network 3 through Wi-Fi (registered trademark: Wireless Fidelity) 73 and Wi-Fi 75. Note that, each of the transmission and reception terminal A300 and the transmission and reception terminal B400 may be connected to the network 3 through a wired LAN.

The transmission and reception terminal A300 is installed at almost the center of a table 70 in the room 510. The information terminal A68, the camera A60, the microphone A61, and the speaker A62 are installed on the table 70 and connected to the transmission and reception terminal A300. Moreover, in the room 510, three participants of a participant E80, a participant F81, and a participant G82 attend (participate in) a video conference. The three participants are on the side opposite to a position of the information terminal A68 across the transmission and reception terminal A300 installed on the table 70. That is, there is a positional relation that the participant E80, the participant F81, the participant G82, and the information terminal A68 surround the transmission and reception terminal A300. Further, the participant E80, the participant F81, and the participant G82 are at positions at which the display A63 of the information terminal A68 is visible, and the video conference is able to be carried out while seeing a displayed image on the display A63 of the information terminal A68.

On the other hand, the transmission and reception terminal B400 is installed on a table 71 in the room 511. The camera B64, the microphone B65, the display B66, and the speaker B67 are installed on the table 71 and connected to the transmission and reception terminal B400. Moreover, in the room 511, a participant H83 attends the video conference. The participant H83 is on the side opposite to a position of the display B66 across the transmission and reception terminal B400 installed on the table 71. That is, the participant H83 is at a position at which the display B66 is visible, and the video conference is able to be carried out while seeing a displayed image on the display B66.

The camera A60 is installed on the transmission and reception terminal A300. On the other hand, the camera B64 is installed on the transmission and reception terminal B400. For example, the camera A60 and the camera B64 are fish-eye cameras that use an equisolid angle projection system in which an area on an image with an angle of view of 180 degrees is proportional to a solid angle, and are installed upwardly so that each angle of view becomes wide and respective optical axes perpendicularly cross a ceiling surface of the room 510 and a ceiling surface of the room 511, respectively. Note that, the ceiling surfaces of the room 510 and the room 511 are respectively parallel to table surfaces of the table 70 and the table 71. For example, the camera A60 is able to simultaneously capture the information terminal A68, the participant E80, the participant F81, and the participant G82 which are positioned to surround the transmission and reception terminal A300 as one image. The camera 1364 is able to simultaneously capture the display B66 and the participant H83 as one image. The microphone A61 and the microphone B65 use a non-directional microphone and are able to collect sound generated around the camera A60 and the camera B64, respectively.

(Processing of Video Conference System 1a)

Next, processing in the video conference system 1a according to the present embodiment will be described in detail with reference to FIG. 15 to FIG. 22.

Figure 15:
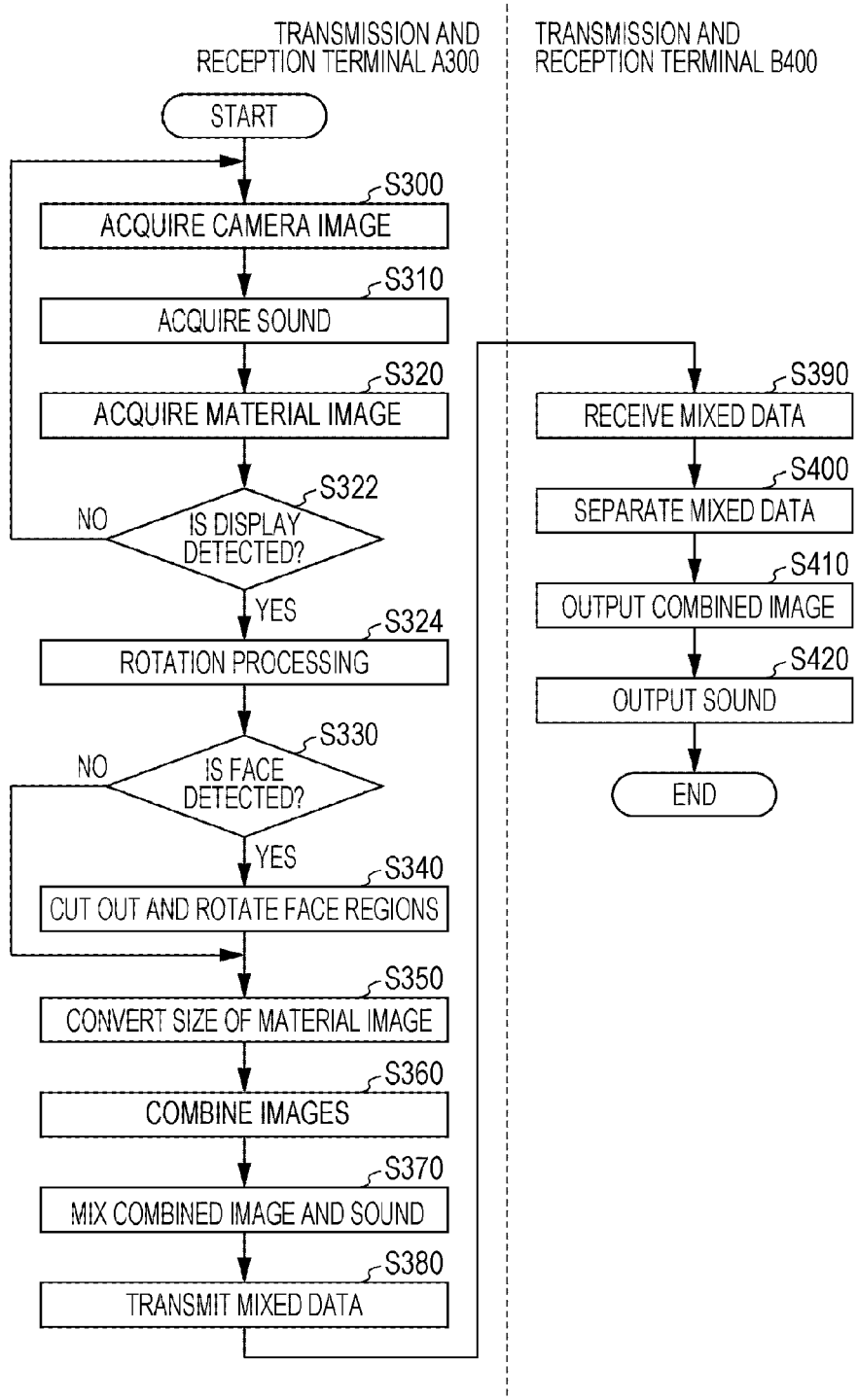
FIG. 15 is a flowchart indicating a flow of processing in the video conference system according to the second embodiment.

FIG. 15 is a flowchart indicating a flow of the processing in the video conference system 1a according to the present embodiment. FIG. 16 to FIG. 22 are explanatory views for explaining functions executed by components in accordance with the processing in the video conference system 1a.

Note that, each processing from step S300 to step S320 in the flow of the processing indicated in FIG. 15 is similar to each processing from step S100 to step S120 indicated in FIG. 3, and description thereof will be omitted as appropriate. Further, each processing from step S330 to step S420 in the flow of the processing indicated in FIG. 15 is similar to each processing from step S130 to step S420 indicated in FIG. 3, and description thereof will be omitted as appropriate.

Figure 16:
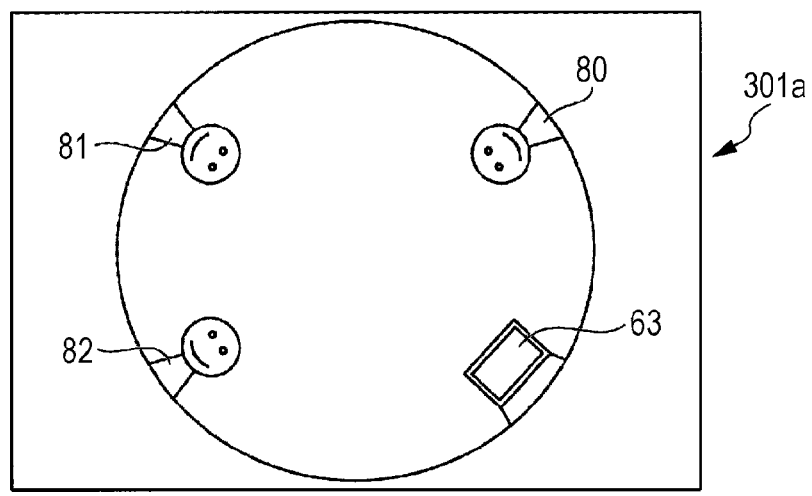
FIG. 16 illustrates an example of an image captured by a camera A according to the second embodiment.

First, the first image acquisition unit A301 acquires a camera image (first image) captured by the camera A60 (step S300). FIG. 16 illustrates an example of a camera image 301a captured by the camera A60. In the camera image 301a of the present example, the information terminal A68, the participant E80, the participant F81, and the participant G82 are captured, and positions at which these objects are captured are different from those of the example illustrated in FIG. 4. For example, in order to obtain an image in which the position of the terminal display 4b of the information terminal 4 (the display A63 of the information terminal A68 in FIG. 16) is at an upper part in a vertical direction and at a center in a horizontal direction as illustrated in FIG. 4, an orientation of the camera A60 needs to be adjusted when the camera A60 is installed. The example of the camera image 301a illustrated in FIG. 16 is an example when the orientation of the camera A60 is not adjusted when the camera A60 is installed, and the position of the display A63 of the information terminal A68 is neither at a position in the upper part in the vertical direction nor at the center in the horizontal direction.

The sound acquisition unit A307 acquires a sound signal from the microphone A61 in response to speeches of the participant E80, the participant F81, and the participant G82 (step S310). The second image acquisition unit A305 acquires a material image (second image) based on data stored in the data storage unit A68a of the information terminal A68 (step S320).

Figure 17:
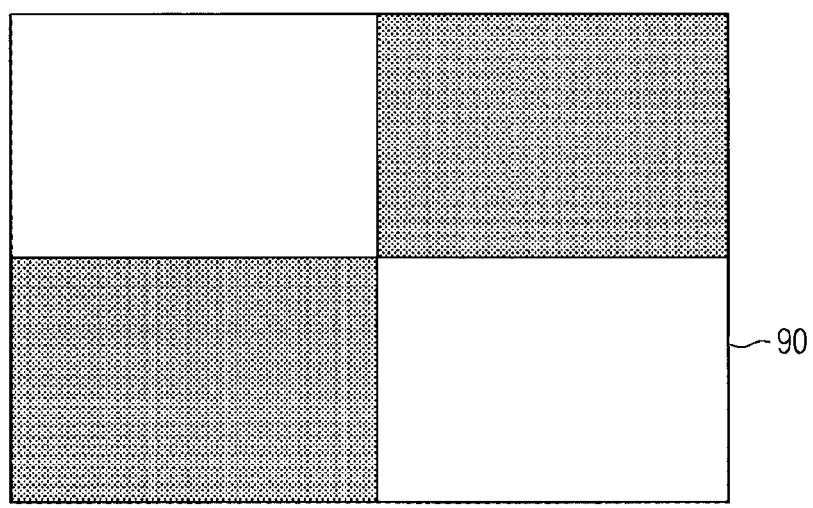
FIG. 17 illustrates an example of a pattern displayed on a display A.
Figure 18:
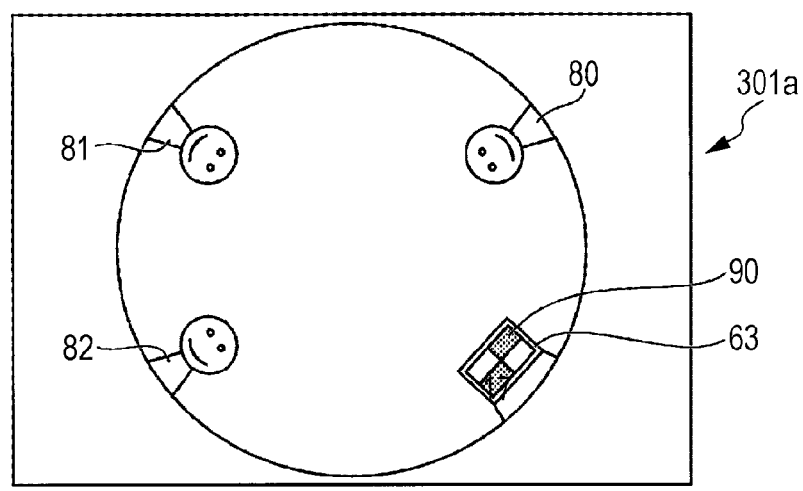
FIG. 18 illustrates an example of a camera image when a pattern is displayed on the display A.

Then, the display detection unit A302 detects the display A63 from the camera image 301a acquired by the first image acquisition unit A301. For example, the display detection unit A302 causes the display A63 to display a fixed pattern and thereby recognizes the pattern to detect the position of the display A63. FIG. 17 illustrates an example of a pattern 90 displayed on the display A63. The illustrated pattern 90 is a black and white plaid pattern on a horizontal 2× vertical 2 basis. FIG. 18 illustrates an example of the camera image 301a acquired by the first image acquisition unit A301 when the pattern 90 in FIG. 17 (for example, horizontal 1280× vertical 720 pixels) is displayed on the display A63.

Figure 19:
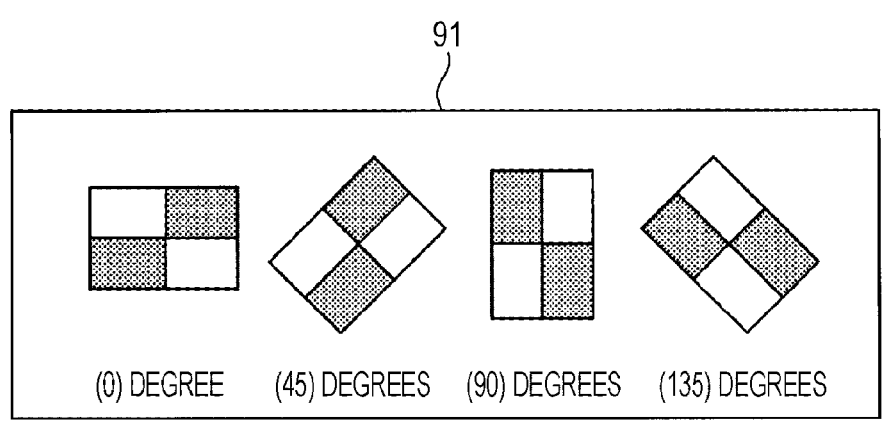
FIG. 19 illustrates an example of a template.

The display detection unit A302 performs template matching by using an image obtained by reducing the size of the pattern 90 as a template 91 (for example, horizontal 80× vertical 45 pixels) to thereby detect the position of the display A63 from the camera image 301a. FIG. 19 illustrates an example of the template 91. For example, four types of images obtained by rotating the reduced image of the pattern 90 by rotation angles of 0 degree, 45 degrees (225 degrees), 90 degrees (270 degrees), and 135 degrees (315 degrees) with a center of the reduced image as a rotational center are used as the template 91.

Figure 20:
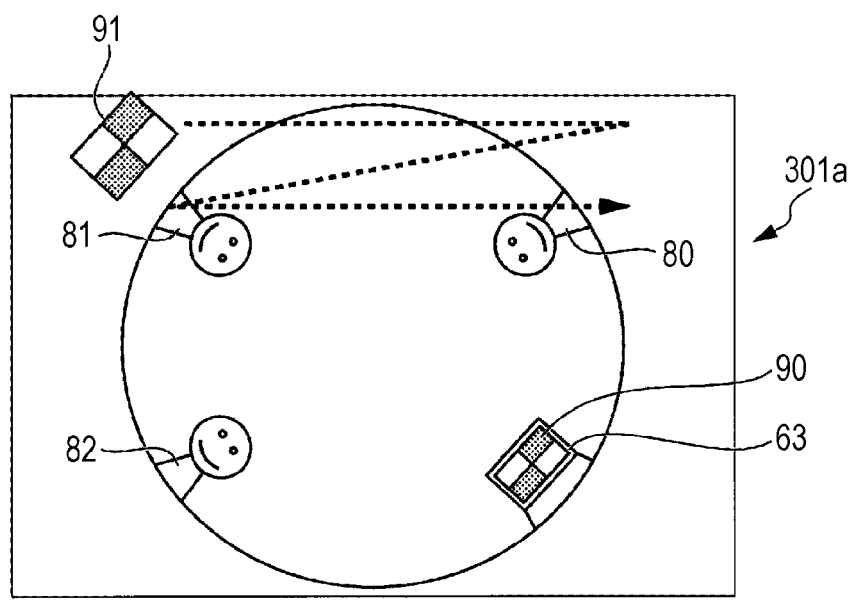
FIG. 20 is an explanatory view of position detection by template matching.

FIG. 20 is an explanatory view of position detection by template matching. The display detection unit A302 performs template matching by four-direction search with use of the templates 91 of the four types of rotational directions in turn, and detects a center coordinate of the template 91 whose degree of coincidence is the greatest as the position of the display A63 in the camera image 301a.

Note that, the display detection unit A302 may cause the display A63 to display a pattern in a single color such as red or blue without limitation to the pattern 90 illustrated in FIG. 17 and detect a center coordinate of a region in which an area of a region in a color similar to that of the displayed pattern is the largest as the position of the display A63.

Next, the rotation processing unit A303 determines whether or not the display A63 is detected from the camera image 301a by the display detection unit A302 (step S322). When it is determined that the display A63 is not detected from the camera image 301a (step S322: No), the rotation processing unit A303 does not perform rotation processing and returns the processing to step S300.

On the other hand, when it is determined that the display A63 is detected from the camera image 301a (step S322: Yes), the rotation processing unit A303 performs rotation processing for the camera image 301a in accordance with the position of the display A63, which is detected by the display detection unit A302. For example, the rotation processing unit A303 rotates the camera image 301a so that the position of the display A63 (display unit), which is detected by the display detection unit A302, is at the upper part in the vertical direction and at the center in the horizontal direction (step S324).

Figure 21:
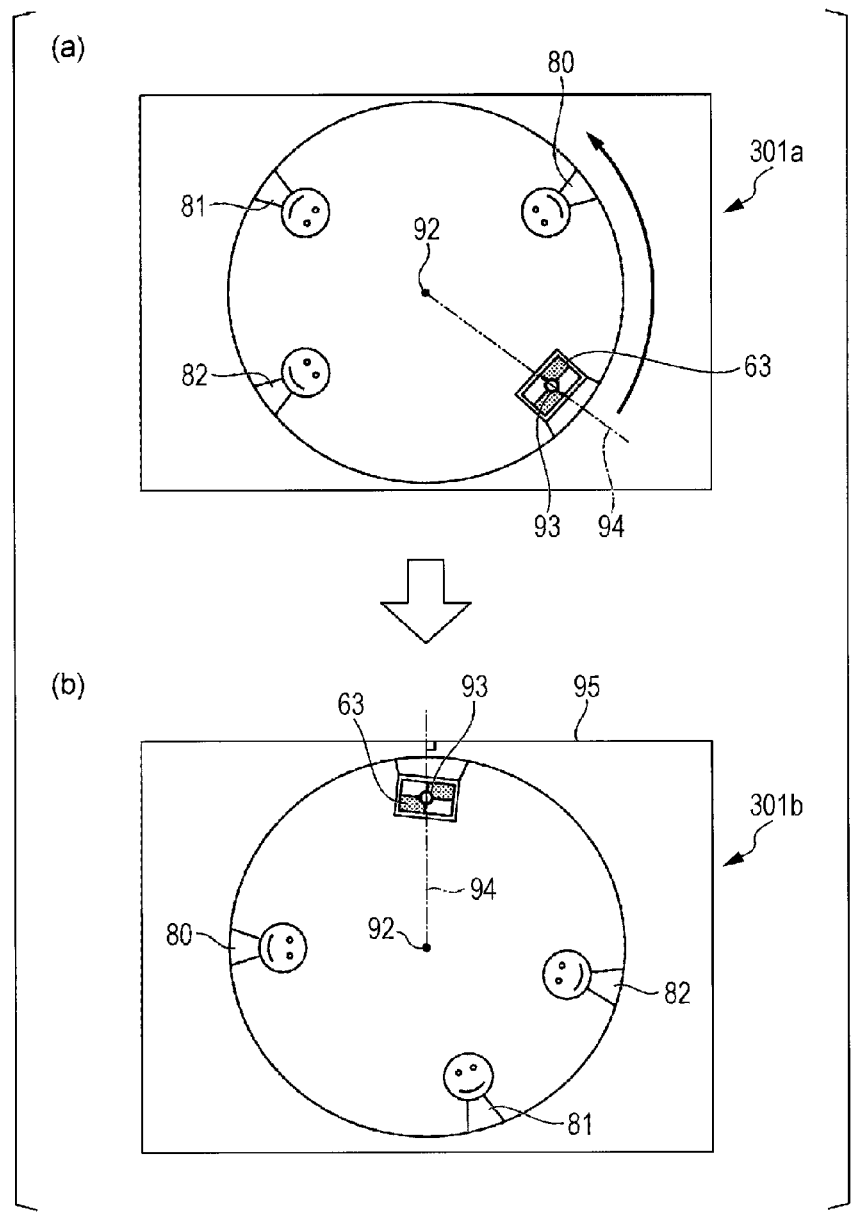
FIG. 21 is an explanatory view for explaining an example of rotation processing according to the second embodiment.

FIG. 21 is an explanatory view for explaining an example of rotation processing according to the present embodiment. FIG. 21(a) illustrates the camera image 301a before the rotation processing and FIG. 21(b) illustrates a camera image 301b after the rotation processing. In FIG. 21(a), a straight line connecting a center coordinate 93 of a screen of the display A63 and a center coordinate 92 of an image region of the camera image 301a is set as a straight line 94. The rotation processing unit A303 rotates the camera image 301a with the center coordinate 92 as a rotational center so that the straight line 94 is orthogonal to an upper side 95 of the camera image 301a. As illustrated in FIG. 21(b), the camera image 301b after the rotation processing becomes an image which is rotated so that the straight line 94 is orthogonal to the upper side 95 of the camera image 301b. That is, the camera image 301b illustrated in FIG. 21(b) is an image rotated so that the position of the display A63 is at the upper part in the vertical direction and at the center in the horizontal direction.

Next, the face detection unit A304 performs face detection processing for the camera image 301b for which the rotation processing has been performed by the rotation processing unit A303 and determines whether or not a face is detected (step S330).

Figure 22:
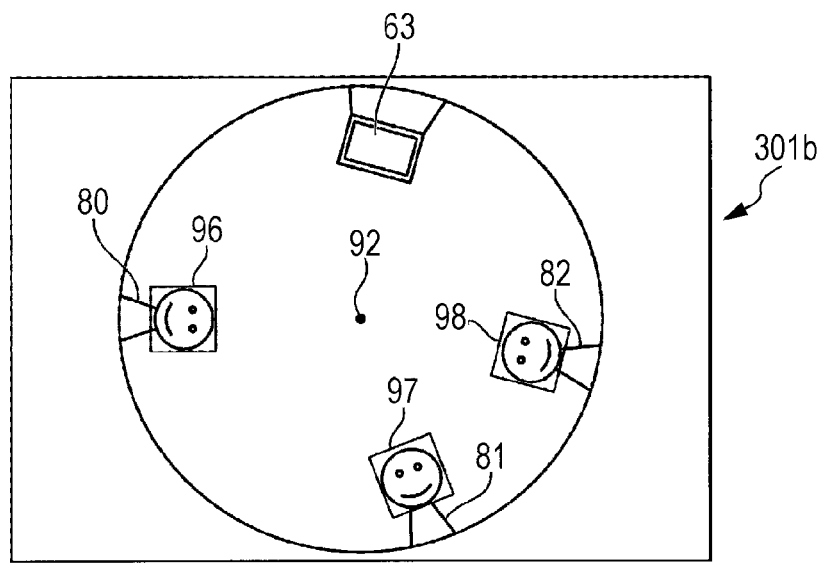
FIG. 22 illustrates a state where faces are detected in a camera image after rotation processing.

When a face is not detected (step S330: No), the face detection unit A304 ends the face detection processing and the procedure proceeds to step S350. On the other hand, when a face is detected (step S330: Yes), the face detection unit A304 supplies a coordinate of a region of the detected face and an angle of a rotational direction of the face when being detected to the combined image generation unit A306. FIG. 22 illustrates a state where faces are detected in the camera image 301b after the rotation processing. The face detection unit A304 detects regions of a face region 96 of the participant E80, a face region 97 of the participant F81, and a face region 98 of the participant F81 as face regions. The state where the faces are detected as illustrated in the figure is similar to the state where the faces are detected as illustrated in FIG. 5. Thus, each processing after step S330 is able to be set as being basically similar to each processing after step S130 in FIG. 3, which has been described in the first embodiment. Description will be given for steps subsequent to step S330 with details thereof omitted.

The combined image generation unit A306 cuts out the regions of the faces from the camera image 301b, for which the rotation processing has been performed by the rotation processing unit A303, based on coordinate information of the face regions detected by the face detection unit A304, and, based on angles of rotational directions of the detected faces, performs rotation processing of the cut-out face images so that the angle of the rotational direction of each of the faces is 0 degree (step S340: refer to FIG. 7). The combined image generation unit A306 performs processing for converting (reducing) a size of a image for the material image acquired by the second image acquisition unit A305 (step S350: refer to FIG. 9).

Subsequently, the combined image generation unit A306 generates a combined image in which the face images, which have been cut out and subjected to the rotation processing, are arranged around an image region of the material image, the size of which has been converted, in accordance with relative positions of the faces in the camera image 301b after the rotation processing (step S360: refer to the combined image 101e in FIG. 12).

The data mixing unit A308 mixes combined image data generated by the combined image generation unit A306 with the sound data acquired by the sound acquisition unit A307 and supplies mixed data which is obtained by mixing to the data transmission unit A309 (step S370). The data transmission unit A309 transmits the mixed data, which is supplied from the data mixing unit A308, to the transmission and reception terminal B400 (step S380).

On the other hand, the transmission and reception terminal B400 receives the mixed data transmitted from the transmission and reception terminal A300. For example, the data reception unit B410 of the transmission and reception terminal B400 receives the mixed data transmitted from the transmission and reception terminal A300 and supplies the data to the data separation unit B411 (step S390). The data separation unit B411 separates the mixed data into image data and sound data. The data separation unit B411 then supplies the separated image data to the image output unit B414 and supplies the separated sound data to the sound output unit B412 (step S400).

The image output unit B414 causes the display B66 to display an according to the image data (step S410). The sound output unit B412 outputs sound according to the sound data from the speaker 1367 (step S420).

Note that, in the present embodiment, the transmission and reception terminal A300 and the transmission and reception terminal B400 have similar functions and are able to mutually transmit and receive an image. Therefore, the transmission and reception terminal B400 is also able to perform similar processing in parallel to processing from step S300 to step S380 performed by the transmission and reception terminal A300, and the transmission and reception terminal A300 is also able to perform similar processing in parallel to processing from step S390 to step S420 performed by the transmission and reception terminal B400.

As described above, in the video conference system 1a according to the present embodiment, at least a pair of terminal devices (for example, the transmission and reception terminal A300 and the transmission and reception terminal B400) transmits and receives an image through the network 3.

For example, the camera A60 included in the transmission and reception terminal A300 captures the camera image 301a (first image) which includes a participant using the transmission and reception terminal A300 and attending a conference and the display A63 (display unit) capable of displaying an image acquired from the transmission and reception terminal 400 (different terminal device). The transmission and reception terminal A300 includes the display detection unit A302 (position detection unit), the rotation processing unit A303, the face detection unit A304, and the combined image generation unit A306 (generation unit).

The display detection unit A302 detects the position of the display A63 from the camera image 301a captured by the camera A60. The rotation processing unit A303 rotates the camera image 301a so that the position of the display A63 detected by the display detection unit A302 is at the upper part in the vertical direction and at the center in the horizontal direction. The face detection unit A304 detects a face from the camera image 301b rotated by the rotation processing unit A303. Then, the combined image generation unit A306 arranges an image of the face detected by the face detection unit A304 around an image region of a material image (second image) of a material used in the conference in accordance with a relative position of the face in the camera image 301b rotated by the rotation processing unit A303.

In this manner, in the video conference system 1a according to the present embodiment, the camera A60 having a wide angle of view is arranged to face upward in the direction of a ceiling, and the camera image 301a captured by the camera A60 is rotated so that the position of the display A63 is at the upper part in the vertical direction and at the center in the horizontal direction, and the face image is displayed around the material image while maintaining a relative positional relation between the faces. Thereby, an image in which the transmission and reception terminal A300 faces the transmission and reception terminal B400 is able to be transmitted and received, so that the participant of the conference is able to make conversation while intuitively recognizing a positional relation with a participant on the counterpart side and visibility of the material image of the conference is able to be ensured. Thus, according to the present embodiment, it is possible to recognize situations of the participant on the counterpart side while maintaining visibility of the material image for the conference.

In the present embodiment, since the transmission and reception terminal A300 and the transmission and reception terminal B400 rotate the camera image 301a so that the position of the display A63 is at the upper part in the vertical direction and at the center in the horizontal direction, it is not necessary to adjust the orientation of the camera A60 when the camera A60 is installed, thus making it possible to save time and effort for installation.

Note that, the video conference system 1a in which the transmission and reception terminal A300 and the transmission and reception terminal B400 that have both a transmission-side function and a reception-side function transmit and receive a image through the network 3 has been described in the present embodiment, but without limitation thereto, the video conference system 1a with a terminal device having a transmission-side function and a reception-side function and a terminal device having a reception-side function as described in the first embodiment may be used. For example, the transmission and reception terminal A300 may include only a configuration having a transmission-side function or only a configuration having a reception-side function of the configuration of the transmission and reception terminal A300 illustrated in FIG. 13. On the other hand, the transmission and reception terminal B400 may include only a configuration having a reception-side function or may include only a configuration having a transmission-side function.

Though the example in which a fish-eye camera having an angle of view of 180 degrees is used for the camera A60 has been described, there is no limitation to the fish-eye camera having an angle of view of 180 degrees as long as being a camera with an angle of view for capturing the display A63 and almost all the participants attending the conference in a room in which the camera A60 is installed. Here, the reason for describing as almost all is that it is not ensured that all the participants are captured by the camera depending on places where the participants are, even when the fish-eye camera having an angle of view of 180 degrees is used. For example, the camera A60 is desired to be a camera having an angle of view to an extent that the display A63 installed on the table 70 and all the participants in the vicinity of the periphery of the table 70 are able to be captured. Moreover, a camera which generates a panorama image or a full-perimeter image by combining a plurality of cameras and outputs the image may be used. In addition, the camera 1364 is similar to the camera A60.

Though the example in which a non-directional microphone is used for the microphone A61 has been described, any microphone may be used as long as being able to input sound generated around the camera A60. In addition, the microphone 1365 is similar to the microphone A61.

Third Embodiment

Next, a third embodiment of the invention will be described.

In the present embodiment, an aspect in which a participant himself/herself of a video conference is able to easily determine whether or not his/her face is detected will be described.

Figure 23:
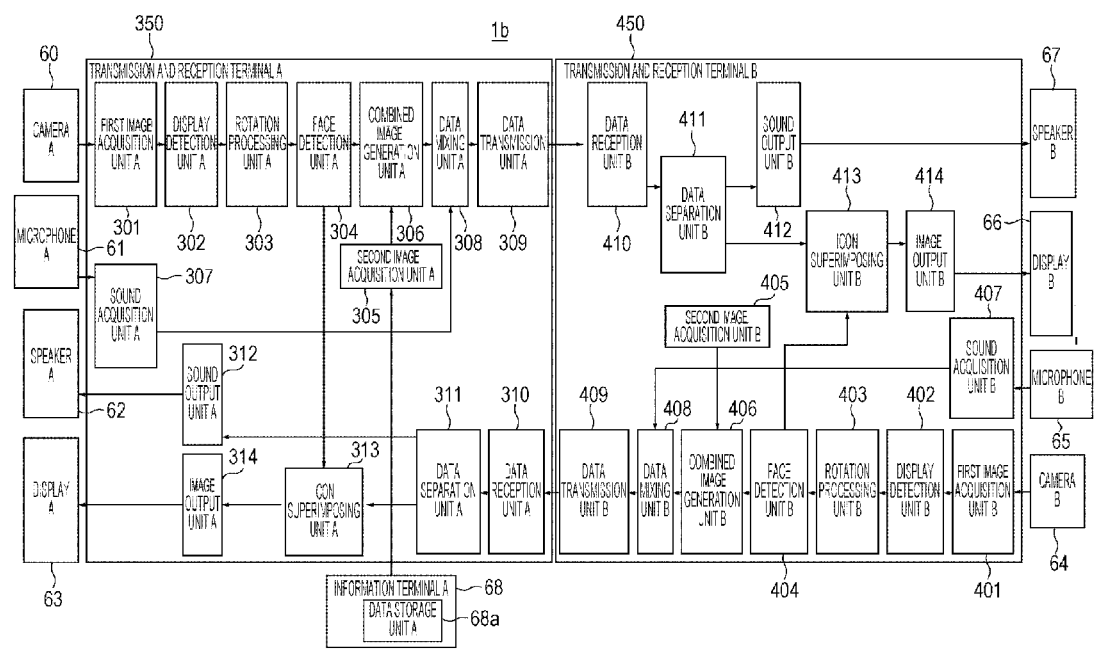
FIG. 23 is a block diagram illustrating an example of a schematic configuration of a video conference system according to a third embodiment.

FIG. 23 is a block diagram illustrating an example of a schematic configuration of a video conference system 1b according to the present embodiment. A configuration of the video conference system 1b illustrated in the figure includes a transmission and reception terminal A350 and a transmission and reception terminal B450 instead of the transmission and reception terminal A300 and the transmission and reception terminal B400 of the video conference system 1a illustrated in FIG. 8. The transmission and reception terminal A350 includes an icon superimposing unit A313 in addition to the configuration of the transmission and reception terminal A300 in FIG. 8. The transmission and reception terminal B450 includes an icon superimposing unit B413 in addition to the configuration of the transmission and reception terminal B400.

The icon superimposing unit A313 superimposes an icon at a position of a face detected by the face detection unit A304 on an image of image data separated by the data separation unit A311. Then, the image output unit A314 causes the display A63 to display the image on which the icon is superimposed by the icon superimposing unit A313. Similarly, the icon superimposing unit B413 superimposes an icon at a position of a face detected by the face detection unit B404 on a image of image data separated by the data separation unit B411. Then, the image output unit B414 causes the display B66 to display the image on which the icon is superimposed by the icon superimposing unit B413. That is, each of the icon superimposing unit A313 and the icon superimposing unit B413 causes the icon to be displayed on an image seen by a participant attending a video conference when the face of the participant himself/herself is detected.

(Processing of Video Conference System 1b)

Next, processing in the video conference system 1b according to the present embodiment will be described in detail with reference to FIG. 24 to FIG. 26. Note that, description will be given by assuming that a usage environment of the video conference system 1b of the present embodiment is similar to the example illustrated in FIG. 14 and described in the second embodiment.

Figure 24:
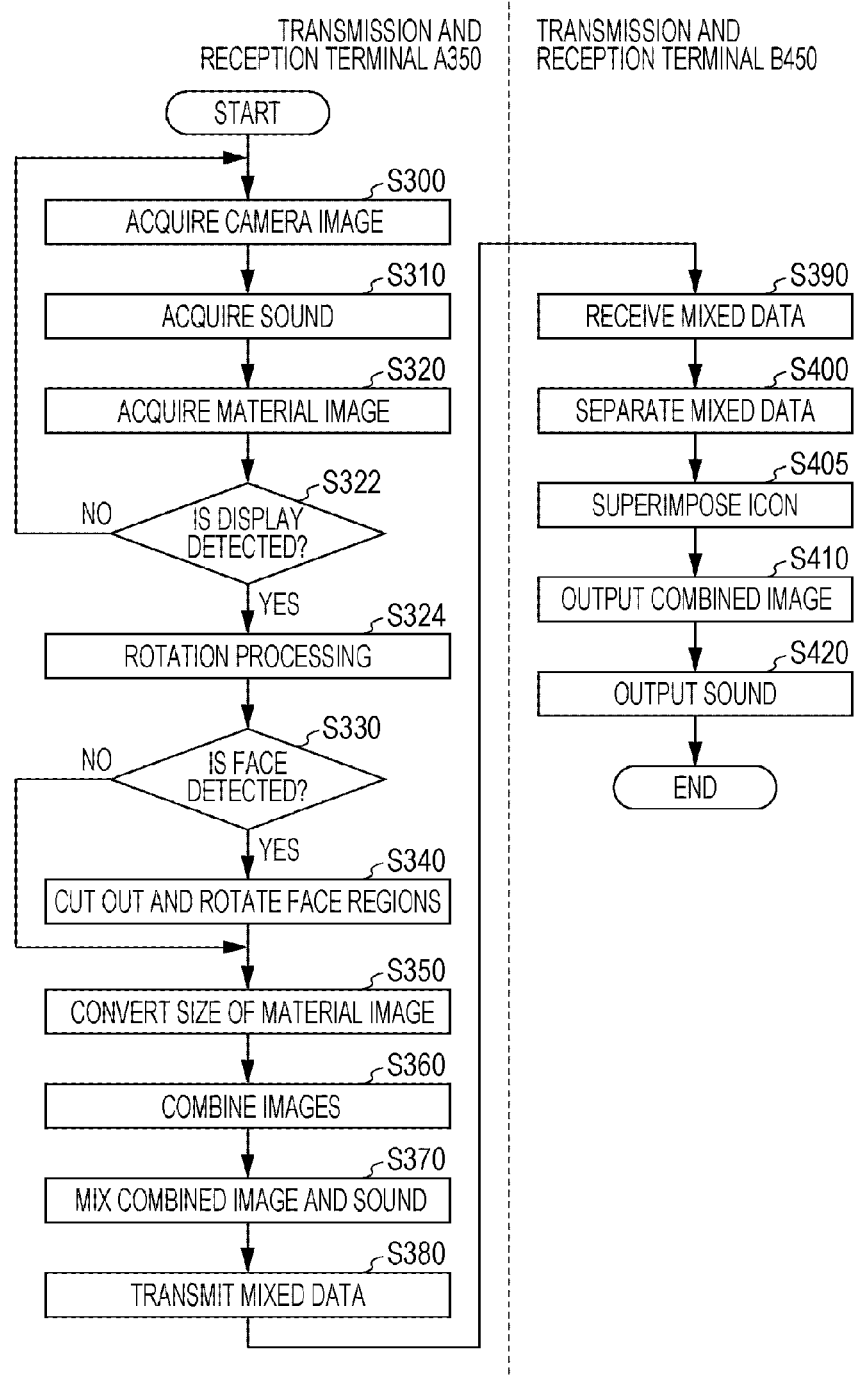
FIG. 24 is a flowchart indicating a flow of processing in the video conference system according to the third embodiment.

FIG. 24 is a flowchart indicating a flow of processing in the video conference system 1b according to the present embodiment. The processing indicated in FIG. 24 is different from the processing indicated in FIG. 15 in that processing of step S405 is added. Note that, processing corresponding to each processing in FIG. 15 is denoted by the same reference sign and description thereof will be omitted, and the processing of step S405 which is a different point will be described here.

The icon superimposing unit B413 of the transmission and reception terminal B450 superimposes an icon corresponding to the face of the participant H83 detected by the face detection unit B404 of the transmission and reception terminal B450 on the image of the image data separated by the data separation unit B411 (step S405). The processing for superimposing the icon will be described in detail below.

Figure 25:
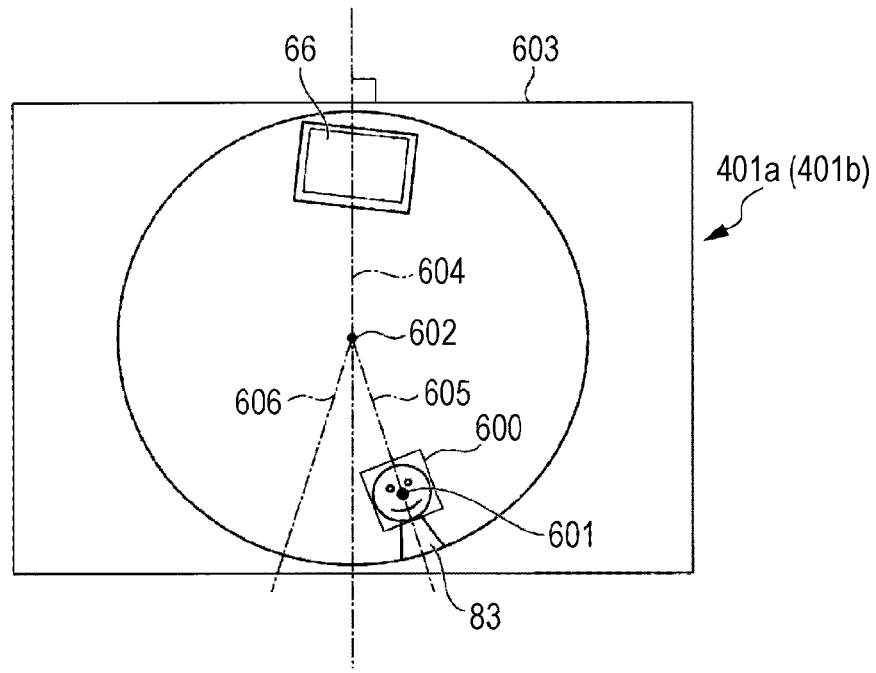
FIG. 25 illustrates a camera image acquired from a camera B by a first image acquisition unit B of a transmission and reception terminal B.

FIG. 25 illustrates a camera image 401a acquired from the camera B64 by the first image acquisition unit B401 of the transmission and reception terminal B450. The camera image 401a is an image of image data separated by the data separation unit B411. In the camera image 401a, the display B66 and the participant H83 are captured, and a face region 600 of the participant H83 is detected by the face detection unit B404.

Note that, in the camera image 401a, the position of the display B66 is at an upper part in a vertical direction and at a center in a horizontal direction. When the position of the display B66 is neither at the upper part in the vertical direction nor at the center in the horizontal direction, face detection processing may be performed by the face detection unit B404 by using a camera image 401b for which rotation processing has been performed by the rotation processing unit B403.

Here, a straight line 606 is set as a straight line obtained by horizontally turning over a straight line 605 extending from a center coordinate 602 of the camera image 401a (401b) and passing a center coordinate 601 of the face region 600 of the participant H83 with respect to a straight line 604 which passes the center coordinate 602 and is orthogonal to an upper side 603 of the camera image 401a (401b) as a reference. In this case, an actual relative position of the face of the participant H83 with a center of a lens of the camera B64 as a reference is able to be represented as a position on the straight line 606 with the center coordinate 602 of the camera image 401a (401b) as a reference.

Figure 26:
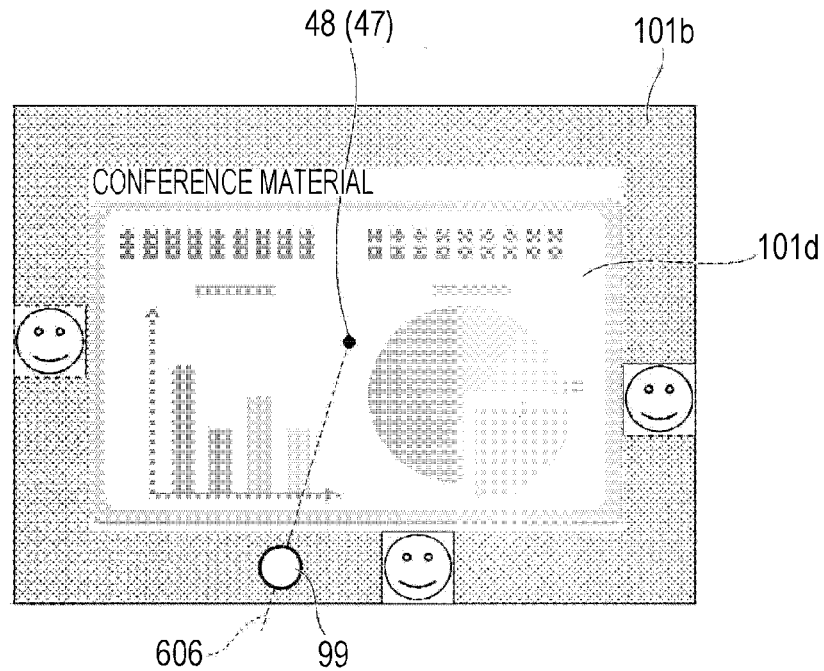
FIG. 26 illustrates an image in which an icon is superimposed on a combined image.

FIG. 26 illustrates an image in which an icon 99 is superimposed on a combined image in which a material image and face images are combined. The icon superimposing unit B413 superimposes the icon 99 corresponding to the face of the participant H83 on a combined image in which the material image 101d and face images are combined (refer to the combined image 101e in FIG. 10). In this case, the icon superimposing unit B413 sets the center coordinate 48 of the image region of the material image 101d as a reference instead of the center coordinate 602 of the camera image 401a (401b) illustrated in FIG. 25, and superimposes the icon 99 corresponding to the face of the participant H83 to be on the line of the straight line 606 when the center coordinate 48 is set as a reference and to be around (outside) the material image 101d.

Here, the icon 99 superimposed by the icon superimposing unit B413 may be an icon of a face image which is cut out and rotated by the combined image generation unit B406 of the transmission and reception terminal B450, or a pattern, a sign, a mark, or the like in addition to the icon of the face image. Further, an icon which is created and registered in advance by a participant may be used.

As described above, in the video conference system 1b according to the present embodiment, the transmission and reception terminal B450 includes the face detection unit B404, the data reception unit B410 (reception unit), and the icon superimposing unit B413 (superimposing unit). The face detection unit B404 detects a face from the camera image 401a captured by the camera B64 (or the camera image 401b after rotation processing). The data reception unit B410 receives an image generated by the combined image generation unit A306 (generation unit) of the transmission and reception terminal A350 (different terminal device). Then, the icon superimposing unit B413 superimposes the icon 99 (first information) according to the face detected by the face detection unit B404 on the image which is received by the data reception unit B410.

In this manner, in the video conference system 1b according to the present embodiment, the icon 99 indicating whether or not a face of a participant of a conference is detected is displayed on a display seen by the participant himself/herself, so that a state of face detection of the participant himself/herself is able to be checked easily within a limited display region in which a material image and a face image of a participant on a counterpart side are displayed, without switching a display to a confirmation screen by the participant.

The icon superimposing unit B413 may superimpose the icon 99 on the image, which is received by the data reception unit B410, in accordance with a position of the face detected by the face detection unit B404. Thereby, in the video conference system 1b, even when there are a plurality of participants of a conference, each participant is able to distinguish his/her icon 99, thus making it possible to easily check a state of face detection of the participant himself/herself.

The icon superimposing unit B413 may set an image used for the icon 99 and an a channel of the created image and perform superimposing so that transparency of the icon 99 is lower than that of image data separated by the image separation unit B411.

Thereby, even when the icon 99 is overlaid with a position at which a face image is combined, it is possible to suppress reduction of visibility of a face image.

Note that, in the present embodiment, the transmission and reception terminal A350 and the transmission and reception terminal B450 have similar functions and are able to mutually transmit and receive an image. Thus, similar processing to the aforementioned processing performed by the icon superimposing unit B413 of the transmission and reception terminal B450 is able to be performed also by the icon superimposing unit A113 of the transmission and reception terminal A350.

Fourth Embodiment

Next, a fourth embodiment of the invention will be described.

In the present embodiment, an aspect in which it is possible to easily determine whether or not a participant on a counterpart side sees a material displayed on a display in a video conference will be described.

Figure 27:
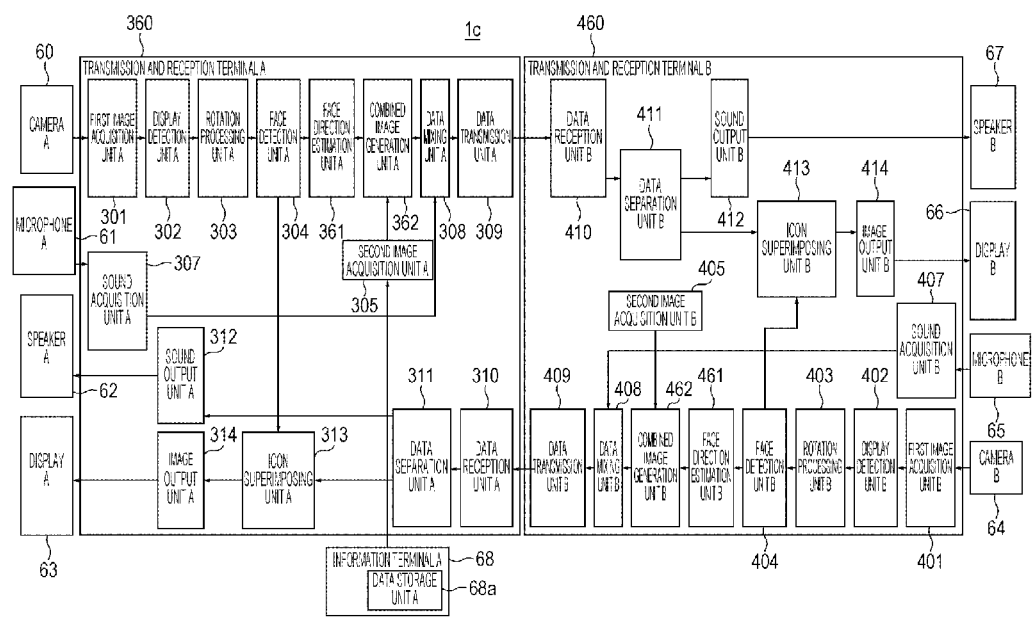
FIG. 27 is a block diagram illustrating an example of a schematic configuration of a video conference system according to a fourth embodiment.

FIG. 27 is a block diagram illustrating an example of a schematic configuration of a video conference system 1c according to the present embodiment. In this figure, a configuration corresponding to each component in FIG. 23 is denoted by the same reference sign and description thereof will be omitted.

A configuration of the video conference system 1c illustrated in FIG. 27 includes a transmission and reception terminal A360 and a transmission and reception terminal B460 instead of the transmission and reception terminal A350 and the transmission and reception terminal B450 of the video conference system 1b illustrated in FIG. 23. The transmission and reception terminal A360 is different from the configuration of the transmission and reception terminal A350 in FIG. 23 in that a face direction estimation unit A361 is further included and that a combined image generation unit A362 combines information according to a face direction of a participant in addition to having the function of the combined image generation unit A306. Similarly, the transmission and reception terminal B460 is different from the configuration of the transmission and reception terminal B450 in FIG. 23 in that a face direction estimation unit B461 is further included and that a combined image generation unit B462 combines information according to a face direction of a participant in addition to having the function of the combined image generation unit B406.

The face direction estimation unit A361 estimates a direction in which a face is directed (face direction) based on an image of a face region detected by the face detection unit A304. For example, the face direction estimation unit A361 extracts positions of a nose, eyes, and a mouth which are feature points of the face from the face region detected by the face detection unit A304, and estimates a degree of an angle at which the face is directed in the right and left direction from the front based on feature amounts obtained from the extracted feature points.

Here, the feature points indicate coordinates of an apex of a nose, edge points of eyes, edge points of a mouth, and the like, and the feature amounts indicate a distance, an area, and the like which are calculated based on these coordinates. For example, the face direction estimation unit A361 obtains feature amounts such as a distance between feature points, an area surrounded by three feature points, luminance distribution, and the like from a plurality of feature points which are extracted. Then, the face direction estimation unit A361 estimates the angle of the face direction by referring to database in which feature amounts obtained from feature points corresponding to angles of face directions which have been obtained in advance by using faces of a plurality of persons are collected and coordinated.

The combined image generation unit A362 cuts out a face region detected by the face detection unit 102 from an image acquired by the first image acquisition unit 101, and generates a combined image in which the cut-out face image is combined with a material image acquired by the second image acquisition unit A305 and an icon according to a face direction of the face, which is estimated by the face direction estimation unit A361, is superimposed at a position corresponding to the combined face image.

Note that, the face direction estimation unit B461 and the combined image generation unit B462 of the transmission and reception terminal B460 respectively have similar functions to those of the face direction estimation unit A361 and the combined image generation unit A362 of the transmission and reception terminal A360.

(Processing of Video Conference System 1c)

Next, processing in the video conference system 1c according to the present embodiment will be described in detail. Note that, description will be given by assuming that a usage environment of the video conference system 1c of the present embodiment is similar to the example illustrated in FIG. 14 and described in the second embodiment.

A flow of the processing according to the present embodiment may be obtained by changing the following processing in the processing indicated in FIG. 15 or FIG. 24. For example, it may be set that the combined image generation unit A362 cuts out a face region and rotation from the camera image 301b and the face direction estimation unit A361 estimates a face direction of the face at step S340 in FIG. 15 or FIG. 24. Further, it may be set that the combined image generation unit A362 generates a combined image in which a face image is combined with a material image and an icon corresponding to a face direction is superimposed at step S360 in FIG. 15 or FIG. 24.

For example, when a direction from the detected face to the display A63 is matched with a face direction of the face estimated by the face direction estimation unit A361, the combined image generation unit A362 arranges an icon indicating the matching at a position corresponding to an image of the face. That is, the combined image generation unit A362 generates an image on which the icon as information indicating whether or not the detected face is directed to the direction of the display A63 is superimposed.

A relation between a direction from a detected face to the display A63 and a face direction of the face estimated by the face direction estimation unit A361 will be described below with reference to FIG. 28 and FIG. 29.

Figure 28:
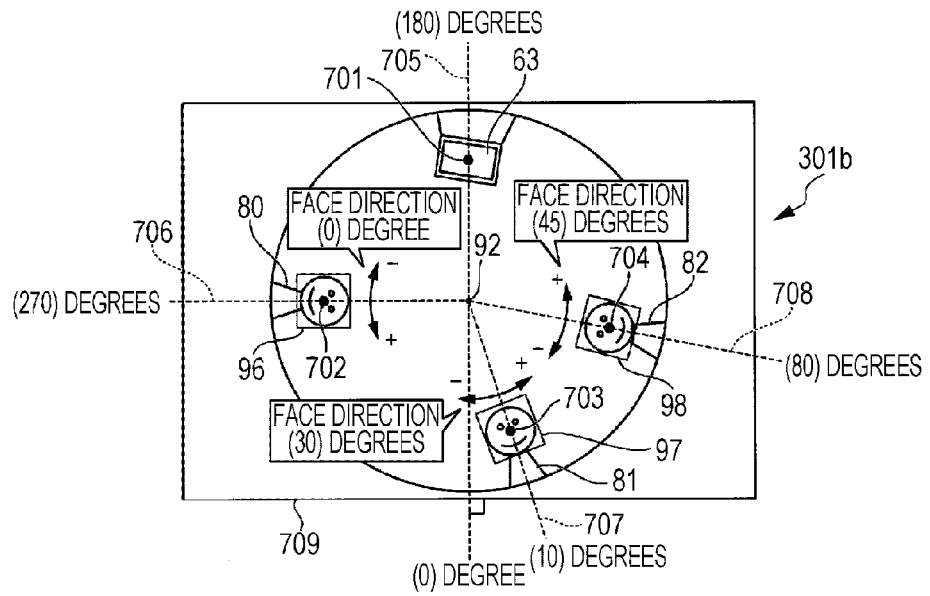
FIG. 28 illustrates relative positions of faces and face directions in a camera image 301b.

FIG. 28 illustrates relative positions of faces and face directions in the camera image 301b. In this figure, a center coordinate of a screen of the display A63 detected from the camera image 301b after rotation processing by the rotation processing unit A303 is set as a coordinate 701. Center coordinates of a face region 96, a face region 97, and a face region 98 detected from the camera image 301b are respectively set as a coordinate 702, a coordinate 703, and a coordinate 704. Straight lines extending from the center coordinate 92 of the image region of the camera image 301b and passing the coordinate 701, the coordinate 702, the coordinate 703, and the coordinate 704 are respectively set as a straight line 705, a straight line 706, a straight line 707, and a straight line 708.

For example, it is set that faces of the participant E80, the participant F81, and the participant G82 are detected by the face detection unit A304 at positions at which angles of rotational directions with the center coordinate 92 as a rotational center are 270 degrees, 10 degrees, and 80 degrees, respectively. An angle of the rotational direction of the display A63 with the center coordinate 92 as a rotational center is 180 degrees. In this case, the angles of the rotational directions of the straight line 705, the straight line 706, the straight line 707, and the straight line 708 are respectively 180 degrees, 270 degrees, 10 degrees, and 80 degrees. Note that, it is assumed that the angle of the rotational direction in the camera image 301b is detected from 0 degree to 359 degrees in a counterclockwise manner by setting that an angle of the rotational direction is 0 degree at a position on a straight line, which extends from the center coordinate 92 and is orthogonal to a lower side 709 of the camera image 301b.

As the face direction, a right direction (left direction when viewed from a participant himself/herself) and a left direction (right direction when viewed from the participant) relative to the front in the camera image 301b are respectively represented with a positive (+) angle and a negative (−) angle. For example, the face direction estimation unit A361 is able to perform estimation in an angle range of up to positive and negative 60 degrees. Here, it is set that estimation is performed such that the face directions of the participant E80, the participant E81, and the participant E82 are respectively 0 degree, 30 degrees, and 40 degrees.

Figure 29:
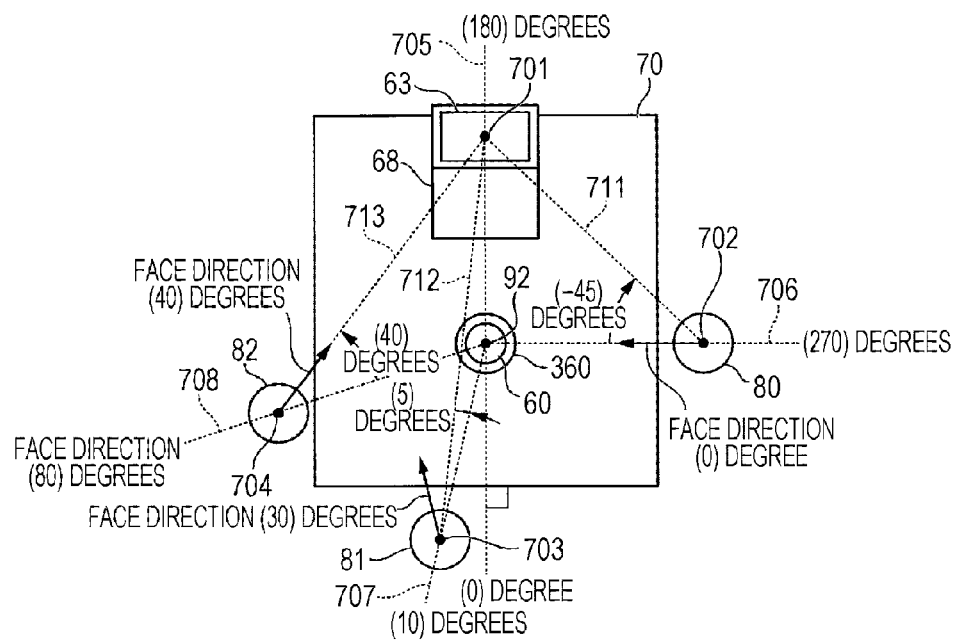
FIG. 29 is a schematic view illustrating a state of a room when seen downward from a ceiling side.

FIG. 29 is a schematic view illustrating a state of the room 501 when seen downward from a ceiling side. Positions captured in the camera image 301b illustrated in FIG. 28 are made to correspond to those in FIG. 29 and denoted by the same reference signs. Note that, to simplify description, description will be given by assuming that distances from the camera A60 to each of the display A63, a face of the participant E80, a face of the participant F81, and a face of the participant G82 are equal to each other.

The center coordinate 92 of a lens of the camera A60 in FIG. 29 corresponds to the center coordinate 92 of the image region of the camera image 301b in FIG. 28. In FIG. 29, angles of the rotational directions of the faces of the participant E81, the participant F81, and the participant G82 are respectively at positions of 270 degrees, 10 degrees, and 80 degrees in a clockwise manner. An angle of the rotational direction of the display A63 is at a position of 180 degrees in a clockwise manner. The coordinate 702, the coordinate 703, and the coordinate 704 respectively correspond to centers of the faces of the participant E80, the participant F81, and the participant G82.

The straight line 706 connecting the coordinate 702 of the center of the face of the participant E80 and the center coordinate 92 is orthogonal to the straight line 705 connecting the coordinate 701 of the center of the display A63 and the center coordinate 92. When a straight line connecting the center coordinate 701 of the screen of the display A63 and the coordinate 702 of the center of the face of the participant E80 is a straight line 711, an angle formed by the straight line 711 and the straight line 706 (acute angle side) is 45 degrees (45 degrees in a negative direction as the face direction of the participant E80). Thus, when the face direction of the participant E80 is −45 degrees, the face of the participant E80 is directed to the direction of the display A63. Here, since it is estimated by the face direction estimation unit A361 that the face direction of the participant E80 is 0 degree, it is possible to determine that the face of the participant E80 is not directed to the direction of the display A63.

An angle formed by the straight line 707 connecting the coordinate 703 of the center of the face of the participant F81 and the center coordinate 92 and the straight line 705 connecting the coordinate 701 of the center of the display A63 and the center coordinate 92 (acute angle side) is 170 degrees. When a straight line connecting the center coordinate 701 of the screen of the display A63 and the coordinate 703 of the center of the face of the participant F81 is a straight line 712, an angle formed by the straight line 712 and the straight line 707 (acute angle side) is 5 degrees (5 degrees in a positive direction as the face direction of the participant F81). Thus, when the face direction of the participant F81 is 5 degrees, the face of the participant F81 is directed to the direction of the display A63. Here, since it is estimated by the face direction estimation unit A361 that the face direction of the participant F81 is 30 degrees, it is possible to determine that the face of the participant F81 is not directed to the direction of the display A63.

An angle formed by the straight line 708 connecting the coordinate 704 of the center of the face of the participant G82 and the center coordinate 92 and the straight line 705 connecting the coordinate 701 of the center of the display A63 and the center coordinate 92 (acute angle side) is 100 degrees. When a straight line connecting the center coordinate 701 of the screen of the display A63 and the coordinate 704 of the center of the face of the participant G82 is a straight line 713, an angle formed by the straight line 713 and the straight line 708 (acute angle side) is 40 degrees (40 degrees in a positive direction as the face direction of the participant G82). Thus, when the face direction of the participant G82 is 40 degrees, the face of the participant G82 is directed to the direction of the display A63. Here, it is estimated by the face direction estimation unit A361 that the face direction of the participant G82 is 40 degrees, the estimated face direction is matched with the direction from the face of the participant G82 to the display A63 and it is possible to determine that the face of the participant G82 is directed to the direction of the display A63.

For example, the combined image generation unit A362 superimposes an icon indicating that the face direction is directed to the direction of the display A63 at a position corresponding to the face image of the participant G82 whose direction of the detected face to the display A63 is matched with the face direction of the face estimated by the face direction estimation unit A361. On the other hand, the combined image generation unit A362 superimposes icons each indicating that the face direction is not directed to the direction of the display A63 at positions corresponding to the face images of the participant E80 and the participant F81 whose directions of the detected faces to the display A63 are not matched with the face directions of the faces estimated by the face direction estimation unit A361.

Figure 30:
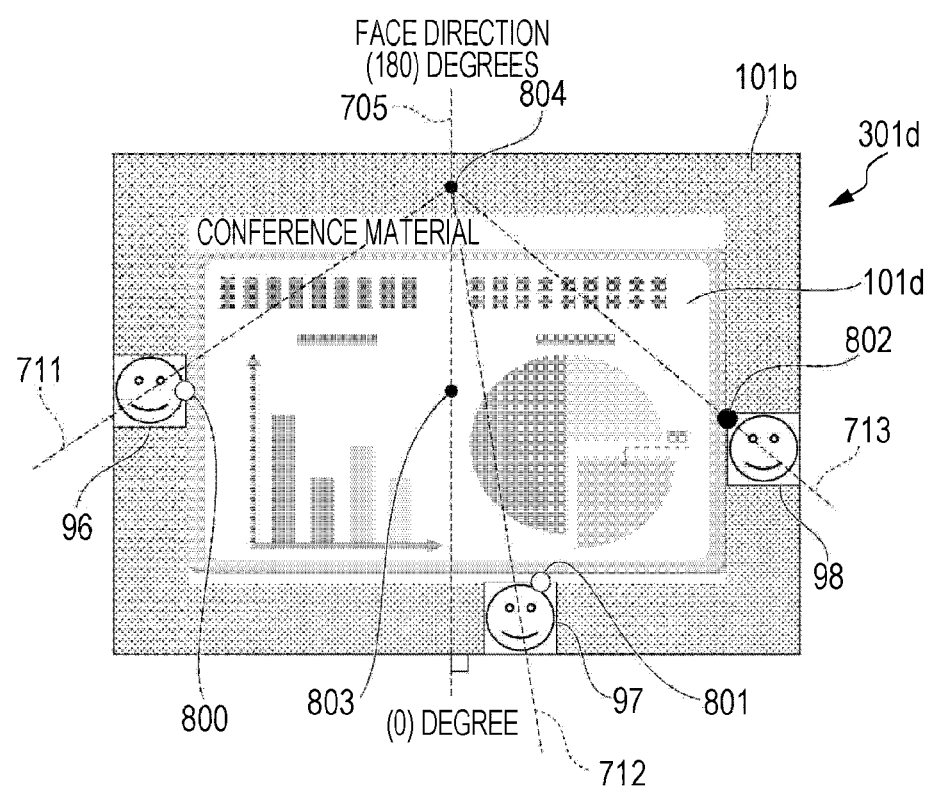
FIG. 30 illustrates an example of a combined image in which icons corresponding to face directions are arranged.

FIG. 30 illustrates an example of a combined image 301d in which icons corresponding to face directions are arranged. In the illustrated example, an icon 800, an icon 801, and an icon 802 are respectively superimposed at positions corresponding to the face regions of the participant E80, the participant F81, and the participant G82 (horizontal 100× vertical 100 pixels). For example, the icons are superimposed on sides in which the material image 101d is in contact with each of the face region 96, the face region 97, and the face region 98.

For example, icons having different colors or densities are displayed for a case where the face direction of the participant is matched with the direction of the display A63 and a case where they are not matched. Here, the face direction of the participant G82 is matched with the direction of the display A63, and the icon 802 is an icon indicating matching (for example, black circle). On the other hand, the icon 800 and the icon 801 are icons each indicating that the face direction of the participant is not matched with the direction of the display A63 (for example, white circle).

Note that, a type of the icons may be differentiated between a case where the face direction of the participant is matched with the direction of the display A63 and a case where they are not matched.

The position of the icon may be changed in accordance with the face direction of the participant. In FIG. 30, a center coordinate 803 of an image region of the combined image 301d corresponds to the center coordinate 92 of the lens of the camera A60 in FIG. 29. A coordinate 804 which is on a straight line on the 180-degree side of the straight line 705 when the center coordinate 803 is set as a reference and which is around (outside) the material image 101d is set as a position corresponding to the center coordinate 701 of the screen of the display A63 in FIG. 29.

That is, in the example illustrated in FIG. 30, a direction directed from the face region of each participant to the coordinate 804 corresponding to the center coordinate of the display A63 serves as the direction of the display A63 to the face of each participant (face direction of 0 degree). Each icon is superimposed at a position according to a difference between the face direction of each participant and the direction from the face of each participant to the display A63 on a side in which the material image 101d is in contact with each face region.

For example, since the face direction of the participant G82 is matched with the direction of the display A63, the icon 802 is superimposed at a position crossing the straight line 713, which connects the center of the face region 98 and the coordinate 804, on the side in which the material image 101d is in contact with the face region 98 of the participant G82.

On the other hand, the face direction of the participant E80 is not matched with the direction of the display A63. Thus, the icon 800 is superimposed at a position separated, according to the face direction, from the position crossing the straight line 711, which connects the center of the face region 96 and the coordinate 804, on the side in which the material image 101d is in contact with the face region 96 of the participant E80. For example, as illustrated in the figure, the icon 800 is superimposed at the position separated from the position crossing the straight line 711 toward the direction in which the face of the participant F80 is directed on the side in which the material image 101d is in contact with the face region 96. Note that, a distance from the position crossing the straight line 711 to the position at which the icon 800 is superimposed is determined, for example, in accordance with magnitude of a difference between the face direction and the direction of the display A63.

Similarly, the face direction of the participant F81 is not matched with the direction of the display A63. Thus, the icon 801 is superimposed at a position separated, according to the face direction, from the position crossing the straight line 712, which connects the center of the face region 97 and the coordinate 804, on the side in which the material image 101d is in contact with the face region 97 of the participant F81.

As described above, in the video conference system 1c according to the present embodiment, for example, the camera A60 included in the transmission and reception terminal A360 captures the camera image 301a (first image) which includes a participant attending a conference by using the transmission and reception terminal A360, and the display A63 (display unit) capable of displaying an image acquired from the transmission and reception terminal B460 (different terminal device).

The transmission and reception terminal A360 includes the display detection unit A302 (position detection unit), the face detection unit A304, the face direction estimation unit A361, and the combined image generation unit A362 (generation unit). The display detection unit A302 detects a position of the display A63 from the camera image 301a captured by the camera A60. The face detection unit A304 detects a face from the camera image 301a captured by the camera A60 (which may be the camera image 301b rotated by the rotation processing unit A303). The face direction estimation unit A361 estimates a face direction of the face based on the face detected by the face detection unit A304. Then, the combined image generation unit A362 generates an image in which an icon (second information) is superimposed at a position corresponding to an image of the face detected by the face detection unit A304 in accordance with a relation between the direction from the face detected by the face detection unit A304 to the position of the display A63 detected by the display detection unit A302 and the face direction estimated by the face direction estimation unit A361.

In this manner, in the video conference system 1c according to the present embodiment, for example, icons indicating whether or not the participant E80, the participant F81, and the participant G82 attending a conference by using the transmission and reception terminal A360 are directed to the direction of the display A63 are displayed on the display B66 seen by the participant H83 attending the conference by using the transmission and reception terminal B460. Thereby, the participant H83 seeing the display 1366 of the transmission and reception terminal B460 is able to know whether or not the participant E80, the participant F81, and the participant G82 on the counterpart side see a material, and thus able to know well the situations of the participants on the counterpart side. It is also possible to know whether or not attention is being paid by the participant E80, the participant F81, and the participant G82 on the counterpart side when giving explanation by using the material. Thus, according to the present embodiment, it is possible to recognize detailed situations of the participants on the counterpart side.

Note that, in the aforementioned description, it has been described that a color or a type of icons may be differentiated between a case where a face direction of each participant is matched with the direction of the display A63 and a case where they are not matched, and it may be determined that they are matched as long as being in a certain range (for example, a range of −10 degrees to 10 degrees) without limitation to a case where they are completely matched. The combined image generation unit A362 may draw an icon only when the face direction is matched with the direction of the display A63.

As above, though the first to fourth embodiments of the invention have been described in detail with reference to the drawings, specific configurations should not be construed as limited by such embodiments and include designs and the like which are made without departing from the scope of the invention and may be changed variously. For example, the functions described in the aforementioned first to fourth embodiments may use any given combination. Each component of the aforementioned embodiments can be desirably selected, and an embodiment with a selected configuration is also included in the invention.

Note that, a part or all of functions of the transmission terminal 100, the reception terminal 200, the transmission and reception terminal A300 (A350, A360), or the transmission and reception terminal B400 (450, 460) in the aforementioned embodiments may be realized by a computer. In this case, the aforementioned functions may be realized by recording a program for realizing the aforementioned functions in a computer-readable recording medium and causing a computer system to read and execute the program recorded in the recording medium. The "computer system" here refers to a computer system built into the transmission terminal 100, the reception terminal 200, the transmission and reception terminal A300 (A350, A360), or the transmission and reception terminal B400 (450, 460), and includes OS and hardware, such as peripheral devices. The "computer-readable recording medium" refers to a portable medium, such as a flexible disk, an optical magnetic disc, a ROM, and a CD-ROM, and a storage device, such as a hard disk that is built into a computer system. The "computer-readable medium" may include one that retains a program for a given time, for example, a volatile memory (RAM) internally provided in a computer system serving as a server and a client in a case where the program is transmitted via a network such as the Internet, or a communication line such as a telephone line. The program may realize a part of the aforementioned functions, and may also realize the aforementioned functions in combination with a program which has been already recorded in a computer system.

A part or all of the transmission terminal 100, the reception terminal 200, the transmission and reception terminal A300 (A350, A360), or the transmission and reception terminal B400 (450, 460) in the aforementioned embodiments may be realized as an integrated circuit such as a LSI (Large Scale Integration). Each functional block of the transmission terminal 100, the reception terminal 200, the transmission and reception terminal A300 (A350, A360), or the transmission and reception terminal B400 (450, 460) may be individually formed into a processor, or a part or all thereof may be integrated and formed into a processor. Further, a method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is also able to be used.

INDUSTRIAL APPLICABILITY

One aspect of the invention is able to be applied to an video conference system in which situations of a participant on a counterpart side needs to be recognized while maintaining visibility of a material image for a conference.

REFERENCE SIGNS LIST 1, 1a, 1b, 1c video conference system
3 network
4 information terminal
4a data storage unit 4b terminal display
5 display
12 camera
13 microphone
14 speaker
60 camera A
61 microphone A
62 speaker A
63 display A
64 camera B
65 microphone B
66 display B
67 speaker B
68 information terminal A
68a data storage unit A
100 transmission terminal
101 first image acquisition unit
102 face detection unit
103 second image acquisition unit
104 combined image generation unit (generation unit)
105 sound acquisition unit
106 data mixing unit
107 data transmission unit
200 reception terminal
208 data reception unit
209 data separation unit
210 sound output unit
211 image output unit
300, 350, 360 transmission and reception terminal A
301 first image acquisition unit A
302 display detection unit A (position detection unit)
303 rotation processing unit A
304 face detection unit A
305 second image acquisition unit A
306, 362 combined image generation unit A (generation unit)
307 sound acquisition unit A
308 data mixing unit A
309 data transmission unit A
310 data reception unit A
311 data separation unit A
312 sound output unit A
313 icon superimposing unit A
314 image output unit A
361 face direction estimation unit A
400, 450, 460 transmission and reception terminal B
401 first image acquisition unit B
402 display detection unit B (position detection unit)
403 rotation processing unit B
404 face detection unit B
405 second image acquisition unit B
406, 462 combined image generation unit B (generation unit)
407 sound acquisition unit B
408 data mixing unit B
409 data transmission unit B
410 data reception unit B
411 data separation unit B
412 sound output unit B
413 icon superimposing unit B
414 image output unit B
461 face direction estimation unit

The invention claimed is:

1. A video conference system in which at least a pair of terminal devices transmits and receives an image through a network, one of the pair of terminal devices comprising:
   a face detection unit that detects a face from a first image captured by a camera;
   a position detection unit that detects a first position of a display unit capable of displaying an image; and
   a generation unit that generates a second image in which a third image of the face detected by the face detection unit is arranged around an image region of a fourth image which is of a material used for a conference, the generation of the second image being performed in accordance to
      a relative position of the face detected by the face detection unit, and
      the first position detected by the position detection unit, wherein
   the camera captures the first image which includes a participant using the one of the pair of terminal devices and attending the conference and the display unit capable of displaying an image acquired from another of the pair of terminal devices,
   the one of the pair of terminal devices further comprises:
   a rotation processing unit that rotates the first image so that the display unit detected by the position detection unit is positioned at an upper part in a vertical direction and at a center in a horizontal direction,
   wherein the generation unit
   arranges the third image in accordance with the relative position of the face in the first image rotated by the rotation processing unit.

2. The video conference system according to claim 1, wherein
   another of the pair of terminal devices comprises:
   a reception unit that receives the second image generated by the generation unit of the one of the pair of terminal devices; and
   a superimposing unit that superimposes first information on the second image received by the reception unit, the superimposing being performed in accordance with the face detected by the face detection unit.

3. A video conference system in which at least a pair of terminal devices transmits and receives an image through a network, one of the pair of terminal devices comprising:
   a face detection unit that detects a face from a first image captured by a camera;
   a position detection unit that detects a first position of a display unit capable of displaying an image; and
   a generation unit that generates a second image in which a third image of the face detected by the face detection unit is arranged around an image region of a fourth image which is of a material used for a conference, the generation of the second image being performed in accordance to
      a relative position of the face detected by the face detection unit, and
      the first position detected by the position detection unit, wherein
   the camera captures the first image which includes a participant using the one of the pair of terminal devices and attending the conference and the display unit capable of displaying an image acquired from another of the pair of terminal devices,
   the one of the pair of terminal devices further comprises:
   a face direction estimation unit that estimates a face direction of the face, based on the face detected by the face detection unit,
   wherein the generation unit generates the second image in which second information is superimposed at a second position corresponding to the face detected by the face detection unit in accordance with a relation between a direction from a third position of the face detected by the face detection unit to the first position of the display unit detected by the position detection unit and the face direction estimated by the face direction estimation unit.

\* \* \* \* \*